(12) United States Patent
Ji et al.

(10) Patent No.: US 12,106,007 B2
(45) Date of Patent: Oct. 1, 2024

(54) COLLABORATIVE DISPLAY METHOD, TERMINAL DEVICE, AND COMPUTER-READABLE STORAGE MEDIUM

(71) Applicant: Huawei Technologies Co., Ltd., Shenzhen (CN)

(72) Inventors: Wei Ji, Shanghai (CN); Zhenchao Lin, Shanghai (CN); Bin Kan, Shanghai (CN); Xue Lu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/341,914

(22) Filed: Jun. 27, 2023

(65) Prior Publication Data

US 2023/0342106 A1   Oct. 26, 2023

Related U.S. Application Data

(63) Continuation of application No. PCT/CN2021/138496, filed on Dec. 15, 2021.

(30) Foreign Application Priority Data

Dec. 28, 2020   (CN) .......................... 202011596431.0

(51) Int. Cl.
  *G06F 3/14*   (2006.01)
  *G06F 3/147*   (2006.01)
  *H04M 1/72409*   (2021.01)

(52) U.S. Cl.
  CPC ............ *G06F 3/1454* (2013.01); *G06F 3/147* (2013.01); *H04M 1/72409* (2021.01)

(58) Field of Classification Search
  CPC ........ G06F 9/451; G06F 3/1454; G06F 3/048; G06F 3/147; G06F 2200/1614; H04M 1/72412; H04M 1/72409; H04M 2250/16; G09G 5/14; G09G 5/38; G09G 2340/0464; G09G 2340/145; G09G 2354/00
  See application file for complete search history.

(56) References Cited

U.S. PATENT DOCUMENTS

| | | | |
|---|---|---|---|
| 9,124,662 B2 * | 9/2015 | Moyers ................ | G06F 3/0484 |
| 9,419,923 B2 * | 8/2016 | Seo ......................... | H04L 51/04 |
| 9,600,223 B2 * | 3/2017 | Kim ...................... | G06F 3/1423 |
| 9,760,331 B2 * | 9/2017 | Lee ...................... | G06F 3/04845 |
| 9,762,651 B1 * | 9/2017 | Sharifi .................. | G06F 40/169 |

(Continued)

FOREIGN PATENT DOCUMENTS

| | | |
|---|---|---|
| CN | 110471639 A | 11/2019 |
| JP | 2014215318 A | 11/2014 |

(Continued)

*Primary Examiner* — Vinh T Lam
(74) *Attorney, Agent, or Firm* — Slater Matsil, LLP

(57) ABSTRACT

This application is applicable to the field of terminal technologies, and in particular, to a collaborative display method, a terminal device, and a computer-readable storage medium. In the method, a first display region of a home screen of a first terminal device in a second terminal device and a second display region of a virtual screen in the second terminal device may be determined, so that the second terminal device may display the home screen in the first display region and display the virtual screen in the second display region.

20 Claims, 25 Drawing Sheets

(56) References Cited

U.S. PATENT DOCUMENTS

| | | | |
|---|---|---|---|
| 10,244,369 B1* | 3/2019 | Sharifi | H04L 67/06 |
| 10,353,718 B2* | 7/2019 | Kimpton | G06F 9/451 |
| 10,474,422 B1* | 11/2019 | Venti | H04L 67/02 |
| 10,491,660 B1* | 11/2019 | Sharifi | G06F 16/957 |
| 10,701,115 B2* | 6/2020 | Huynh | G06F 3/04886 |
| 10,884,620 B2* | 1/2021 | Kim | G06F 3/0483 |
| 10,893,081 B2* | 1/2021 | Lo | H04L 67/131 |
| 10,955,990 B2* | 3/2021 | Clediere | H04L 51/52 |
| 10,963,630 B1* | 3/2021 | Sharifi | H04L 67/06 |
| 11,089,134 B1* | 8/2021 | Gordon | H04W 4/023 |
| 11,243,736 B2* | 2/2022 | Kwahk | H04N 21/482 |
| 11,269,475 B2* | 3/2022 | Sarnoff | G06F 3/1454 |
| 11,281,478 B2* | 3/2022 | Momchilov | G06F 3/0482 |
| 11,282,410 B2* | 3/2022 | Carney | G06F 3/1462 |
| 11,288,031 B2* | 3/2022 | Yoshida | H04L 67/02 |
| 11,372,658 B2* | 6/2022 | Wang | G06F 3/0481 |
| 11,487,423 B2* | 11/2022 | Hassan | G06F 3/04883 |
| 11,721,073 B2* | 8/2023 | Bilbrey | H04N 1/00323 |
| | | | 348/333.02 |
| 11,785,123 B2* | 10/2023 | Coverstone | H04M 1/724092 |
| | | | 455/557 |
| 2014/0298355 A1 | 10/2014 | Kim et al. | |
| 2015/0033148 A1* | 1/2015 | Kuchoor | H04N 21/237 |
| | | | 715/753 |
| 2015/0040019 A1* | 2/2015 | Oh | G06F 9/451 |
| | | | 715/738 |
| 2015/0334138 A1* | 11/2015 | Conklin | G06F 9/452 |
| | | | 715/753 |
| 2016/0328098 A1* | 11/2016 | Santhakumar | G06F 3/0481 |
| 2019/0121498 A1* | 4/2019 | Jakobovits | G06F 3/0482 |
| 2019/0340833 A1* | 11/2019 | Furtwangler | G06F 3/011 |
| 2020/0310834 A1* | 10/2020 | Momchilov | H04L 67/131 |
| 2020/0310835 A1* | 10/2020 | Momchilov | G06F 9/45533 |
| 2020/0336518 A1* | 10/2020 | Huynh | G06F 3/0481 |
| 2020/0413120 A1* | 12/2020 | Kim | H04N 21/472 |
| 2021/0004197 A1* | 1/2021 | Santhakumar | H04M 3/567 |
| 2021/0006749 A1* | 1/2021 | Koike | G06F 3/0481 |
| 2021/0019106 A1* | 1/2021 | Duan | G06F 3/1462 |
| 2021/0342042 A1* | 11/2021 | Singh | H04L 67/133 |
| 2021/0342049 A1* | 11/2021 | Singh | G06F 9/452 |
| 2022/0342850 A1* | 10/2022 | Cao | G06F 16/168 |
| 2022/0398059 A1* | 12/2022 | Zhu | G06F 3/0482 |

FOREIGN PATENT DOCUMENTS

| | | |
|---|---|---|
| JP | 2020522151 A | 7/2020 |
| WO | 2020253758 A1 | 12/2020 |

* cited by examiner

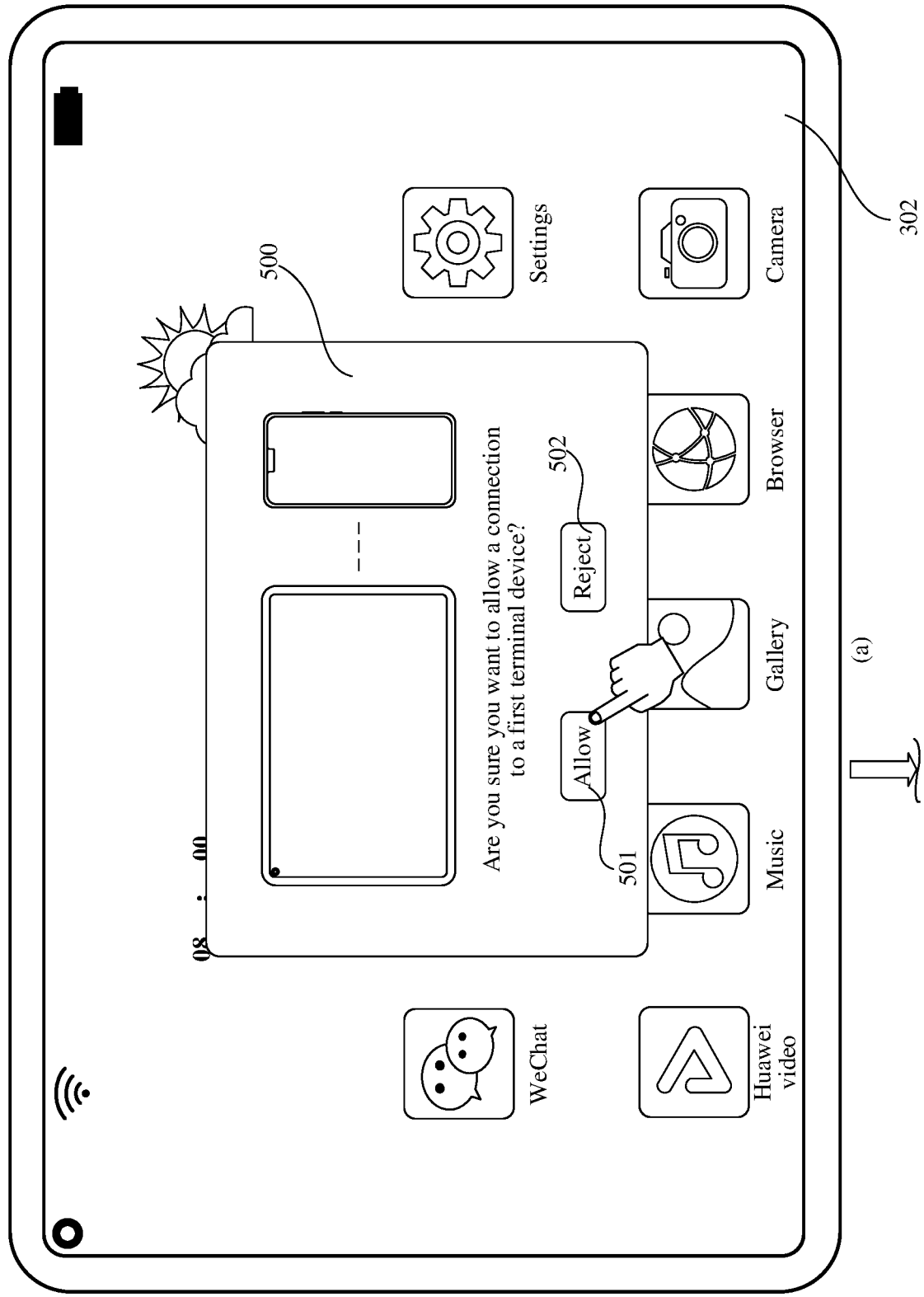
(a)
TO FIG. 5-2   FIG. 5-1

COLLABORATIVE DISPLAY METHOD, TERMINAL DEVICE, AND COMPUTER-READABLE STORAGE MEDIUM

CROSS-REFERENCE TO RELATED APPLICATIONS

This application is a continuation of International Application No. PCT/CN2021/138496, filed on Dec. 15, 2021, which claims priority to Chinese Patent Application No. 202011596431.0, filed on Dec. 28, 2020. The disclosures of the aforementioned applications are hereby incorporated by reference in their entireties.

TECHNICAL FIELD

This application pertains to the field of terminal technologies, and in particular, to a collaborative display method, a terminal device, and a computer-readable storage medium.

BACKGROUND

Collaborative display is a process in which two or more terminal devices collaboratively and consistently complete a display service. In existing collaborative display, a plurality of display windows may be set on a second terminal device (for example, a tablet computer) to display a plurality of applications of a first terminal device (for example, a mobile phone). However, when a display state of the first terminal device changes (for example, changes from a portrait-mode display state to a landscape-mode display state), the display window of the second terminal device also changes correspondingly (for example, changes from a portrait window to a landscape window). Therefore, content displayed in each display window needs to be laid out and refreshed again. Consequently, a delay in displaying content in the second terminal device is caused, and user experience is affected.

SUMMARY

Embodiments of this application provide a collaborative display method, a terminal device, and a computer-readable storage medium, so that in collaborative display, when a display state of a first terminal device changes, a quantity of times of laying out and refreshing content again can be reduced, to reduce a delay in displaying content in a second terminal device and improve user experience.

According to a first aspect, an embodiment of this application provides a collaborative display method, applied to a first terminal device. The method may include: determining a first display region of a first home screen of the first terminal device in a second terminal device and a second display region of a virtual screen of the first terminal device in the second terminal device based on a first display state of the first terminal device; projecting the first home screen onto the second terminal device, and sending first location information of the first display region to the second terminal device, where the first location information is used by the second terminal device to display the first home screen in the first display region; projecting the virtual screen onto the second terminal device, and sending second location information of the second display region to the second terminal device, where the second location information is used by the second terminal device to display the virtual screen in the second display region; when it is detected that the first terminal device is adjusted from the first display state to a second display state, adjusting a content display manner of the first home screen based on the second display state, to obtain a second home screen, and reorganizing the first display region and the second display region based on the second display state; and projecting the second home screen and the virtual screen onto the second terminal device, and sending third location information of a reorganized first display region and fourth location information of a reorganized second display region to the second terminal device, where the third location information is used by the second terminal device to display the second home screen in the reorganized first display region, and the fourth location information is used by the second terminal device to display the virtual screen in the reorganized second display region.

In the collaborative display method, the first terminal device may determine the first display region of the home screen of the first terminal device in the second terminal device and the second display region of the virtual screen in the second terminal device based on the display state of the first terminal device, so that the second terminal device can display the home screen in the first display region, and display the virtual screen in the second display region. When the display state of the first terminal device changes, the first terminal device may dynamically adjust only a content display manner of the home screen, the first display region, and the second display region, and does not need to adjust a content display manner of the virtual screen and a relative location of the virtual screen in the second display region. Therefore, content of an application displayed on the virtual screen does not need to be laid out or refreshed again, to reduce a delay in displaying content displayed in the second display region and improve user experience. In this way, usability and practicability are high.

Optionally, before the projecting the virtual screen onto the second terminal device, the method may include: when a start instruction that is for an application and that is sent by the second terminal device is obtained, creating the virtual screen based on the first home screen, and displaying an application interface of the application on the virtual screen, where the virtual screen is not displayed in the first terminal device.

In the collaborative display method provided in this implementation, when the user taps an application on the first home screen of the second terminal device, the second terminal device may send, to the first terminal device, an instruction for opening the application. In this case, the first terminal device may create the virtual screen, display the application interface of the application on the virtual screen, and project the virtual screen onto the second display region of the second terminal device, so that the second terminal device can simultaneously open a plurality of windows of the first terminal device, to facilitate browsing of the user and improve user experience.

In a possible implementation of the first aspect, the determining a first display region of a first home screen of the first terminal device in a second terminal device and a second display region of a virtual screen of the first terminal device in the second terminal device based on a first display state of the first terminal device may include: obtaining interface information of the second terminal device; and determining the first display region and the second display region based on the first display state of the first terminal device and the interface information of the second terminal device.

In the collaborative display method provided in this implementation, the first terminal device may accurately determine the first display region and the second display region based on the interface information of the second terminal device and the first display state of the first terminal device, to ensure that the second terminal device can display more windows of the first terminal device, improve utilization of a display interface of the second terminal device, and improve browsing experience of the user.

For example, the interface information includes an interface height and an interface width, and the determining the first display region and the second display region based on the first display state of the first terminal device and the interface information of the second terminal device may include: when the first display state is a portrait-mode display state, determining that a first region height of the first display region is the same as a second region height of the second display region, and the first region height and the second region height are the same as the interface height; and determining that a first region width of the first display region is the same as a screen width of the first home screen.

For example, the interface information includes an interface height and an interface width, and the determining the first display region and the second display region based on the first display state of the first terminal device and the interface information of the second terminal device may include: when the first display state is a landscape-mode display state, determining that a first region width of the first display region is the same as a second region width of the second display region, and the first region width and the second region width are the same as the interface width; and determining that a first region height of the first display region is the same as a screen height of the first home screen.

In another possible implementation of the first aspect, the first terminal device is a terminal device with a foldable display, and the interface information includes an interface height and an interface width; and the determining the first display region and the second display region based on the first display state of the first terminal device and the interface information of the second terminal device may include: when the first display state is an unfolded-screen display state, determining a third display state of the second terminal device based on the interface height and the interface width; and determining the first display region and the second display region based on the third display state and the interface information.

In the collaborative display method provided in this implementation, when the first terminal device with a foldable display is in the unfolded-screen display state, the home screen of the first terminal device increases correspondingly, and an area of the first display region also needs to increase accordingly. The first terminal device may further determine the first display region and the second display region with reference to a display state and the interface information of the second terminal device, to fully use the display interface of the second terminal device and improve utilization of the display interface of the second terminal device.

Optionally, the determining the first display region and the second display region based on the third display state and the interface information may include:
when the third display state is a landscape-mode display state, determining that a first region height of the first display region is the same as a second region height of the second display region, and the first region height and the second region height are the same as the interface height; and
determining that a first region width of the first display region is the same as a screen width of the first home screen or a screen height of the first home screen.

Optionally, the determining the first display region and the second display region based on the third display state and the interface information may include:
when the third display state is a portrait-mode display state, determining that a first region width of the first display region is the same as a second region width of the second display region, and the first region width and the second region width are the same as the interface width; and determining that a first region height of the first display region is the same as a screen height of the first home screen or a screen width of the first home screen.

According to a second aspect, an embodiment of this application provides a collaborative display method, applied to a second terminal device. The method may include: obtaining a first display state of a first terminal device, and determining a first display region of a first home screen of the first terminal device in the second terminal device and a second display region of a virtual screen of the first terminal device in the second terminal device based on the first display state; obtaining the first home screen projected by the first terminal device, and displaying the first home screen in the first display region; obtaining the virtual screen projected by the first terminal device, and displaying the virtual screen in the second display region; when it is determined that the first terminal device is adjusted from the first display state to a second display state, reorganizing the first display region and the second display region based on the second display state; and obtaining a second home screen and the virtual screen that are projected by the first terminal device, displaying the second home screen in a reorganized first display region, and displaying the virtual screen in a reorganized second display region, where a content display manner of the second home screen corresponds to the second display state.

In the collaborative display method, the second terminal device may determine the first display region of the home screen of the first terminal device in the second terminal device and the second display region of the virtual screen in the second terminal device based on the display state of the first terminal device, and may display the home screen in the first display region, and display the virtual screen in the second display region. When the display state of the first terminal device changes, the second terminal device may dynamically adjust only the first display region, and the second display region, and does not need to adjust a content display manner of the virtual screen and a relative location of the virtual screen in the second display region. Therefore, content of an application displayed on the virtual screen does not need to be laid out or refreshed again, to reduce a delay in displaying content displayed in the second display region and improve user experience. In this way, usability and practicability are high.

Optionally, before the obtaining the virtual screen projected by the first terminal device, the method may include: sending, to the first terminal device in response to a start operation performed on an application on the first home screen, a start instruction for starting the application, where the start instruction is used by the first terminal device to start the application, and display an application interface of the application on the virtual screen.

In a possible implementation of the second aspect, the determining a first display region of a first home screen of the first terminal device in the second terminal device and a second display region of a virtual screen of the first terminal device in the second terminal device based on the first display state may include: obtaining interface information of the second terminal device; and determining the first display region and the second display region based on the first display state and the interface information of the second terminal device.

For example, the interface information includes an interface height and an interface width, and the determining the first display region and the second display region based on the first display state and the interface information of the second terminal device may include: when the first display state is a portrait-mode display state, determining that a first region height of the first display region is the same as a second region height of the second display region, and the first region height and the second region height are the same as the interface height; and determining that a first region width of the first display region is the same as a screen width of the first home screen.

For example, the interface information includes an interface height and an interface width, and the determining the first display region and the second display region based on the first display state and the interface information of the second terminal device may include: when the first display state is a landscape-mode display state, determining that a first region width of the first display region is the same as a second region width of the second display region, and the first region width and the second region width are the same as the interface width; and determining that a first region height of the first display region is the same as a screen height of the first home screen.

In another possible implementation of the second aspect, the first terminal device is a terminal device with a foldable display, and the interface information includes an interface height and an interface width; and the determining the first display region and the second display region based on the first display state and the interface information of the second terminal device may include: when the first display state is an unfolded-screen display state, determining a third display state of the second terminal device based on the interface height and the interface width; and determining the first display region and the second display region based on the third display state and the interface information.

Optionally, the determining the first display region and the second display region based on the third display state and the interface information may include: when the third display state is a landscape-mode display state, determining that a first region height of the first display region is the same as a second region height of the second display region, and the first region height and the second region height are the same as the interface height; and determining that a first region width of the first display region is the same as a screen width of the first home screen or a screen height of the first home screen.

Optionally, the determining the first display region and the second display region based on the third display state and the interface information may include: when the third display state is a portrait-mode display state, determining that a first region width of the first display region is the same as a second region width of the second display region, and the first region width and the second region width are the same as the interface width; and determining that a first region height of the first display region is the same as a screen height of the first home screen or a screen width of the first home screen.

According to a third aspect, an embodiment of this application provides a collaborative display apparatus, applied to a first terminal device. The apparatus may include: a display region determining module, configured to determine a first display region of a first home screen of the first terminal device in a second terminal device and a second display region of a virtual screen of the first terminal device in the second terminal device based on a first display state of the first terminal device; a home screen projection module, configured to: project the first home screen onto the second terminal device, and send first location information of the first display region to the second terminal device, where the first location information is used by the second terminal device to display the first home screen in the first display region; a virtual screen projection module, configured to: project the virtual screen onto the second terminal device, and send second location information of the second display region to the second terminal device, where the second location information is used by the second terminal device to display the virtual screen in the second display region; a display region reorganization module, configured to: when it is detected that the first terminal device is adjusted from the first display state to a second display state, adjust a content display manner of the first home screen based on the second display state, to obtain a second home screen, and reorganize the first display region and the second display region based on the second display state; and a collaborative display module, configured to: project the second home screen and the virtual screen onto the second terminal device, and send third location information of a reorganized first display region and fourth location information of a reorganized second display region to the second terminal device, where the third location information is used by the second terminal device to display the second home screen in the reorganized first display region, and the fourth location information is used by the second terminal device to display the virtual screen in the reorganized second display region.

Optionally, the apparatus may further include: a virtual screen creation module, configured to: when a start instruction that is for an application and that is sent by the second terminal device is obtained, create the virtual screen based on the first home screen, and display an application interface of the application on the virtual screen, where the virtual screen is not displayed in the first terminal device.

In a possible implementation of the third aspect, the display region determining module may include: an interface information obtaining unit, configured to obtain interface information of the second terminal device; and a display region determining unit, configured to determine the first display region and the second display region based on the first display state of the first terminal device and the interface information of the second terminal device.

For example, the interface information includes an interface height and an interface width; and the display region determining unit is configured to: when the first display state is a portrait-mode display state, determine that a first region height of the first display region is the same as a second region height of the second display region, and the first region height and the second region height are the same as the interface height; and determine that a first region width of the first display region is the same as a screen width of the first home screen.

For example, the interface information includes an interface height and an interface width; and the display region determining unit is further configured to: when the first display state is a landscape-mode display state, determine that a first region width of the first display region is the same as a second region width of the second display region, and the first region width and the second region width are the same as the interface width; and determine that a first region height of the first display region is the same as a screen height of the first home screen.

In another possible implementation of the third aspect, the first terminal device is a terminal device with a foldable display, and the interface information includes an interface height and an interface width; and the display region determining unit may include: a display state determining subunit, configured to: when the first display state is an unfolded-screen display state, determine a third display state of the second terminal device based on the interface height and the interface width; and a display region determining subunit, configured to determine the first display region and the second display region based on the third display state and the interface information.

Optionally, the display region determining subunit is configured to: when the third display state is a landscape-mode display state, determine that a first region height of the first display region is the same as a second region height of the second display region, and the first region height and the second region height are the same as the interface height; and determine that a first region width of the first display region is the same as a screen width of the first terminal device or a screen height of the first terminal device.

Optionally, the display region determining subunit is further configured to: when the third display state is a portrait-mode display state, determine that a first region width of the first display region is the same as a second region width of the second display region, and the first region width and the second region width are the same as the interface width; and determine that a first region height of the first display region is the same as a screen height of the first terminal device or a screen width of the first terminal device.

According to a fourth aspect, an embodiment of this application provides a collaborative display apparatus, applied to a second terminal device. The apparatus may include: a display region determining module, configured to: obtain a first display state of a first terminal device, and determine a first display region of a first home screen of the first terminal device in the second terminal device and a second display region of a virtual screen of the first terminal device in the second terminal device based on the first display state; a home screen obtaining module, configured to: obtain the first home screen projected by the first terminal device, and display the first home screen in the first display region; a virtual screen obtaining module, configured to: obtain the virtual screen projected by the first terminal device, and display the virtual screen in the second display region; a display region reorganization module, configured to: when it is determined that the first terminal device is adjusted from the first display state to a second display state, reorganize the first display region and the second display region based on the second display state; and a collaborative display module, configured to: obtain a second home screen and the virtual screen that are projected by the first terminal device, display the second home screen in a reorganized first display region, and display the virtual screen in a reorganized second display region, where a content display manner of the second home screen corresponds to the second display state.

Optionally, the apparatus may further include: a start instruction sending module, configured to send, to the first terminal device in response to a start operation performed on an application on the first home screen, a start instruction for starting the application, where the start instruction is used by the first terminal device to start the application, and display an application interface of the application on the virtual screen.

According to a fifth aspect, an embodiment of this application provides a terminal device, including a memory, a processor, and a computer program that is stored in the memory and that may run on the processor. When the processor executes the computer program, the terminal device is enabled to implement the method according to any possible implementation of the first aspect.

According to a sixth aspect, an embodiment of this application provides a computer-readable storage medium. The computer-readable storage medium stores a computer program, and when the computer program is executed by a computer, the computer is enabled to implement the method according to any possible implementation of the first aspect.

According to a seventh aspect, an embodiment of this application provides a computer program product. When the computer program product runs on a terminal device, the terminal device is enabled to perform the method according to any possible implementation of the first aspect.

BRIEF DESCRIPTION OF THE DRAWINGS

FIG. 4 and FIG. 5-1 and FIG. 5-2 are schematic diagrams of establishing a connection between a first terminal device and a second terminal device;

FIG. 15-1 and FIG. 15-2 to FIG. 17 are schematic diagrams 1 of application scenarios according to an embodiment of this application;

DETAILED DESCRIPTION OF ILLUSTRATIVE EMBODIMENTS

Figure 1:
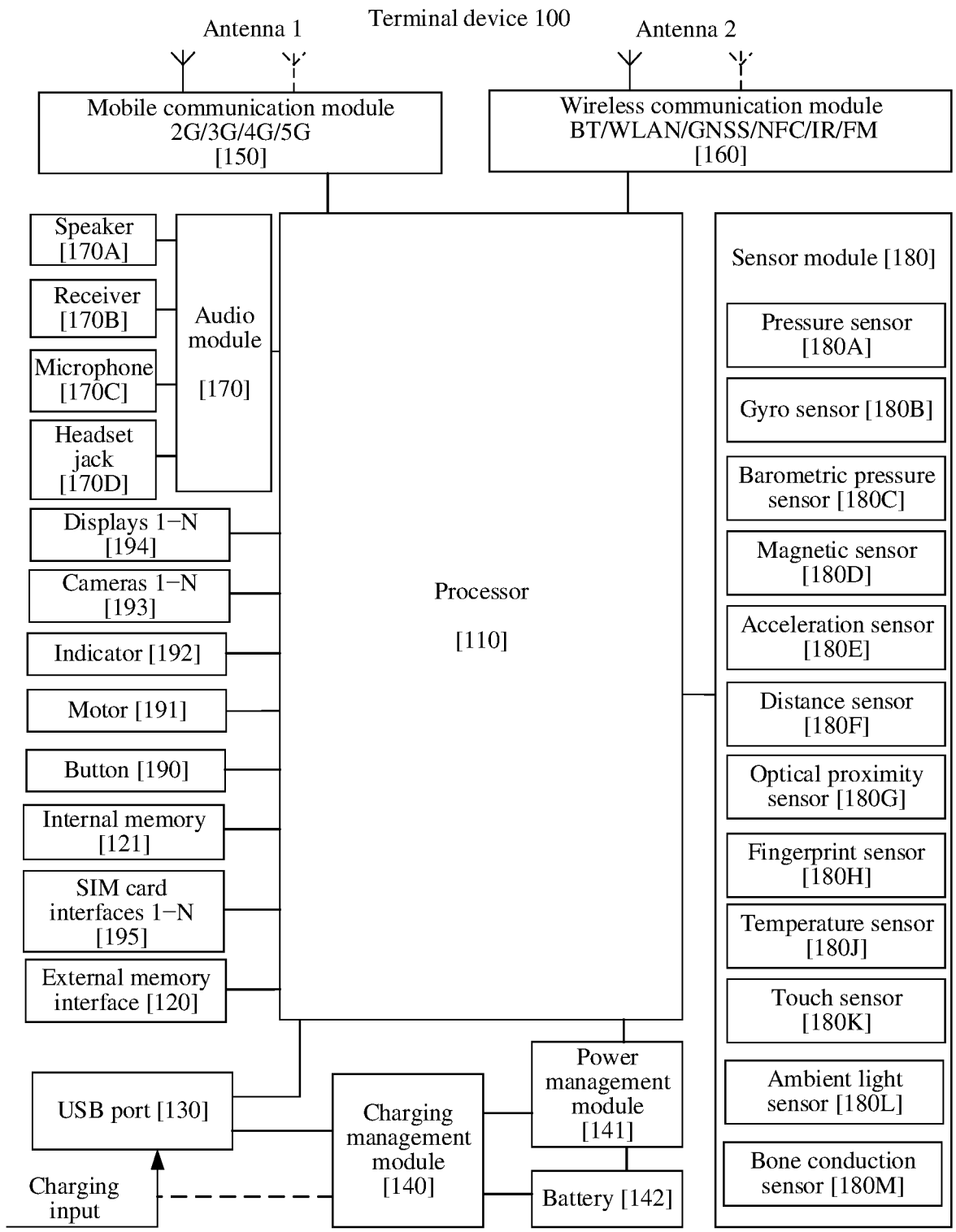
FIG. 1 is a schematic diagram of a structure of a terminal device to which a collaborative display method is applicable according to an embodiment of this application.

It should be understood that the term "include" used in the specification and the appended claims of this application indicates presence of the described features, entireties, steps, operations, elements, and/or components, with presence or addition of one or more other features, entireties, steps, operations, elements, components, and/or a combination thereof not excluded.

It should be further understood that the term "and/or" used in the specification and the appended claims of this application indicates any combination and all possible combinations of one or more items listed in association, and includes the combinations.

As used in the specification and the appended claims of this application, the term "if" may be interpreted as "when" or "once" or "in response to determining" or "in response to detecting" based on the context. Similarly, the phrase "if it is determined that" or "if it (a described condition or event) is detected" may be interpreted as a meaning of "once it is determined that" or "in response to determining" or "once it (a described condition or event) is detected" or "in response to detecting (a described condition or event)" based on the context.

In addition, in the description of the specification and the appended claims of this application, the terms "first", "second", "third", and the like are only used to distinguish descriptions, but cannot be understood as indicating or implying relative importance.

Reference to "an embodiment", "some embodiments", or the like described in the specification of this application indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

In addition, "a plurality of" mentioned in embodiments of this application should be interpreted as two or more.

Steps in a collaborative display method provided in embodiments of this application are merely examples. Not all steps are mandatory steps, or not content in each piece of information or a message is mandatory. In a use process, the step or the content may be added or removed based on a requirement. In different embodiments, mutual reference is made to a same step or steps or messages having a same function in embodiments of this application.

A service scenario described in embodiments of this application is intended to describe the technical solutions in embodiments of this application more clearly, and do not constitute a limitation on the technical solutions provided in embodiments of this application. Persons of ordinary skill in the art may know that, with evolution of a network architecture and emergence of a new service scenario, the technical solutions provided in embodiments of this application are also applicable to a similar technical problem.

As described in the background part, in existing collaborative display, when a plurality of display windows are set on a second terminal device (for example, a tablet computer) to display a plurality of applications of a first terminal device (for example, a mobile phone), if a display state of the first terminal device changes (for example, changes from a portrait-mode display state to a landscape-mode display state), the display window of the second terminal device also changes correspondingly (for example, changes from a portrait-mode window to a landscape-mode window). Therefore, content displayed in each display window needs to be laid out and refreshed again. Consequently, a delay in displaying content in the second terminal device is caused, and user experience is affected.

To resolve the foregoing problem, an embodiment of this application provides a collaborative display method. During collaborative display, a first terminal device may create a virtual screen independent of a home screen, and may separately send display information of the home screen and the virtual screen to a second terminal device. The second terminal device may display the home screen in a first display region, and may display the virtual screen in a second display region. When a display state of the first terminal device changes, only a content display manner of the home screen, the first display region, and the second display region may be dynamically adjusted, and a content display manner of the virtual screen and a relative location of the virtual screen in the second display region do not need to be adjusted. Therefore, content of an application displayed on the virtual screen does not need to be laid out or refreshed again, to reduce a delay in displaying content displayed in the second display region and improve user experience. In this way, usability and practicability are high.

The collaborative display method provided in this embodiment of this application may be applied to a terminal device. The terminal device may be a terminal device with a display, for example, a mobile phone, a tablet computer, a wearable device, a vehicle-mounted device, an augmented reality (AR)/virtual reality (VR) device, a notebook computer, an ultra-mobile personal computer (UMPC), a netbook, a personal digital assistant (PDA), a desktop computer, or a smart television.

FIG. 1 is a schematic diagram of a structure of a terminal device 100. The terminal device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the terminal device 100. In some other embodiments of this application, the terminal device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, to improve system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general purpose input/output (GPIO) interface, a subscriber identity module (SIM) interface, a universal serial bus (USB) port, and/or the like.

The I2C interface is a bidirectional synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call through a Bluetooth headset.

The PCM interface may also be used for audio communication, and analog signal sampling, quantization, and coding. In some embodiments, the audio module 170 may be coupled to the wireless communication module 160 through the PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 and the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 and a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the terminal device 100. The processor 110 communicates with the display 194 through the DSI interface, to implement a display function of the terminal device 100.

The GPIO interface may be configured by software. The GPIO interface may be configured as a control signal or a data signal. In some embodiments, the GPIO interface may be configured to connect the processor 110 and the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is an interface that conforms to a USB standard specification, and may be specifically a mini USB port, a micro USB port, a USB Type C port, or the like. The USB port 130 may be configured to connect to the charger to charge the terminal device 100, or may be configured to transmit data between the terminal device 100 and a peripheral device, or may be configured to connect to a headset, to play audio by using the headset. The interface may be further configured to connect to another terminal device, for example, an AR device.

It can be understood that an interface connection relationship between the modules shown in this embodiment of this application is merely an example for description, and constitutes no limitation on the structure of the terminal device 100. In some other embodiments of this application, different interface connection manners in the foregoing embodiments or a combination of a plurality of interface connection manners may alternatively be used for the terminal device 100.

The charging management module 140 is configured to receive a charging input from the charger. The charger may be a wireless charger, or may be a wired charger. In some embodiments of wired charging, the charging management module 140 may receive a charging input from a wired charger through the USB port 130. In some embodiments of wireless charging, the charging management module 140 may receive a wireless charging input through a wireless charging coil of the terminal device 100. While charging the battery 142, the charging management module 140 may further supply power to the terminal device by using the power management module 141.

The power management module 141 is configured to connect to the battery 142, the charging management module 140, and the processor 110. The power management module 141 receives an input of the battery 142 and/or the charging management module 140, and supplies power to the processor 110, the internal memory 121, the display 194, the camera 193, the wireless communication module 160, and the like. The power management module 141 may be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device wo may be configured to cover one or more communication frequency bands. Different antennas may be multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the terminal device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit the received electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium/high frequency signal. The demodulator is configured to demodulate a received electromagnetic wave signal into a low-frequency baseband signal. Then, the demodulator transfers, to the baseband processor for processing, the low-frequency baseband signal obtained through demodulation. The low-frequency baseband signal is processed by the baseband processor and then transmitted to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the terminal device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the terminal device 100 are coupled, and the antenna 2 and the wireless communication module 160 in the terminal device 100 are coupled, so that the terminal device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, and execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the terminal device 100 may include 1 or N displays 194, where N is a positive integer greater than 1.

The terminal device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (, CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 193, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transformation on frequency energy.

The video codec is configured to compress or decompress a digital video. The terminal device 100 may support one or more video codecs. Therefore, the terminal device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU may be used to implement applications such as intelligent cognition of the terminal device 100, for example, image recognition, facial recognition, voice recognition, and text understanding.

The external memory interface 120 may be configured to connect to an external storage card, for example, a micro SD card, to extend a storage capability of the terminal device 100. The external memory card communicates with the processor 110 through the external memory interface 120, to implement a data storage function. For example, files such as music and videos are stored in the external storage card.

The internal memory 121 may be configured to store computer-executable program code, and the executable program code includes instructions. The internal memory 121 may include a program storage area and a data storage area. The program storage area may store an operating system, an application required by at least one function (for example, a voice playing function or an image playing function), and the like. The data storage area may store data (for example, audio data or an address book) created in a process of using the terminal device 100, and the like. In addition, the internal memory 121 may include a high-speed random access memory, and may further include a nonvolatile memory, for example, at least one magnetic disk storage device, a flash storage device, or a universal flash storage (universal flash storage, UFS). The processor 110 runs the instructions stored in the internal memory 121, and/or instructions stored in memory disposed in the processor, to execute various function applications and data processing of the terminal device 100.

The terminal device 100 may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "horn", is configured to convert an electrical audio signal into a sound signal. The terminal device 100 may be configured to listen to music or answer a call in a hands-free mode by using the speaker 170A.

The receiver 170B, also referred to as an "earpiece", is configured to convert an electrical audio signal into a sound signal. When a call is answered or voice information is received by using the terminal device 100, the receiver 170B may be put close to a human ear to listen to a voice.

The microphone 170C, also referred to as a "mike" or "mic", is configured to convert a sound signal into an electrical signal. When making a call or sending audio information, a user may make a sound near the microphone 170C through the mouth of the user, to input a sound signal into the microphone 170C. At least one microphone 170C may be disposed in the terminal device 100. In some other embodiments, two microphones 170C may be disposed in the terminal device 100, to implement a noise reduction function in addition to collecting a sound signal. In some other embodiments, three, four, or more microphones 170C may alternatively be disposed in the terminal device 100, to collect a sound signal, implement noise reduction, and identify a sound source, to implement a directional recording function, and the like.

The headset jack 170D is configured to connect to a wired headset. The headset jack 170D may be a USB port 130, or may be a 3.5 mm open mobile terminal platform (OMTP) standard interface, or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The terminal device 100 determines pressure intensity based on the change in the capacitance. When a touch operation is performed on the display 194, the terminal device 100 detects intensity of the touch operation through the pressure sensor 180A. The terminal device 100 may also calculate a touch location based on a detection signal of the pressure sensor 180A. In some embodiments, touch operations that are performed on a same touch location but have different touch operation intensity may correspond to different operation instructions. For example, when a touch operation whose touch operation intensity is less than a first pressure threshold is performed on a Messaging application icon, an instruction for viewing an SMS message is executed. When a touch operation whose touch operation intensity is greater than or equal to the first pressure threshold is performed on the Messaging application icon, an instruction for newly creating an SMS message is executed.

The gyro sensor 180B may be configured to determine a moving posture of the terminal device 100. In some embodiments, an angular velocity of the terminal device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyro sensor 180B may be further used in a navigation scenario and a motion sensing game scenario.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip leather case by using the magnetic sensor 180D. In some embodiments, when the terminal device 100 is a flip phone, the terminal device 100 may detect opening and closing of a flip cover based on the magnetic sensor 180D, and further set features such as automatic unlocking of the flip cover based on a detected opening and closing state of the flip leather case or opening and a detected opening and closing state of the flip cover.

The acceleration sensor 180E may detect an acceleration value of the terminal device 100 in various directions (usually on three axes). When the terminal device 100 is still, a magnitude and a direction of gravity may be detected. The acceleration sensor 180E may be further configured to recognize a posture of the terminal device, and is applied to an application such as switching between landscape mode and a portrait mode or a pedometer.

The distance sensor 180F is configured to measure a distance. The terminal device 100 may measure the distance in an infrared manner or a laser manner. In some embodiments, in a photographing scenario, the terminal device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The terminal device 100 emits infrared light by using the light-emitting diode. The terminal device 100 detects infrared reflected light from a nearby object by using the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The terminal device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal device 100 is in a pocket, to avoid an accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy based on the temperature detected by the temperature sensor 180J. For example, when the temperature reported by the temperature sensor 180J exceeds a threshold, the terminal device 100 lowers performance of a processor near the temperature sensor 180J, to reduce power consumption and implement thermal protection. In some other embodiments, when the temperature is less than another threshold, the terminal device 100 heats the battery 142 to prevent the terminal device 100 from being shut down abnormally due to a low temperature. In some other embodiments, when the temperature is less than still another threshold, the terminal device 100 boosts an output voltage of the battery 142 to avoid abnormal shutdown due to a low temperature.

The touch sensor 180K is also referred to as a "touch device". The touch sensor 180K may be disposed on the display 194. The touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor, to determine a touch event type. The display 194 may be configured to provide a visual output related to the touch operation. In some other embodiments, the touch sensor 180K may also be disposed on a surface of the terminal device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a human pulse, to receive a blood pressure beating signal. In some embodiments, the bone conduction sensor 180M may alternatively be disposed in a headset, to be combined into a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive a key input, and generate a key signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, photographing or audio playing) may correspond to different vibration feedback effects. The motor 191 may also correspond to different vibration feedback effects for touch operations performed on different regions of the display 194. Different application scenarios (for example, a time reminder, receiving information, an alarm clock, and a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 together. The plurality of cards may be of a same type or different types. The SIM card interface 195 may be compatible with different types of SIM cards. The SIM card interface 195 may also be compatible with an external memory card. The terminal device 100 interacts with a network by using the SIM card, to implement functions such as conversation and data communication. In some embodiments, an eSIM, namely, an embedded SIM card, is used for the terminal device 100. The eSIM card may be embedded into the terminal device 100, and cannot be separated from the terminal device 100.

A layered architecture, an event-driven architecture, a microkernel architecture, a microservice architecture, or a cloud architecture may be used for a software system of the terminal device 100. In this embodiment of this application, an Android system with a layered architecture is used as an example to illustrate a software structure of the terminal device 100.

Figure 2:
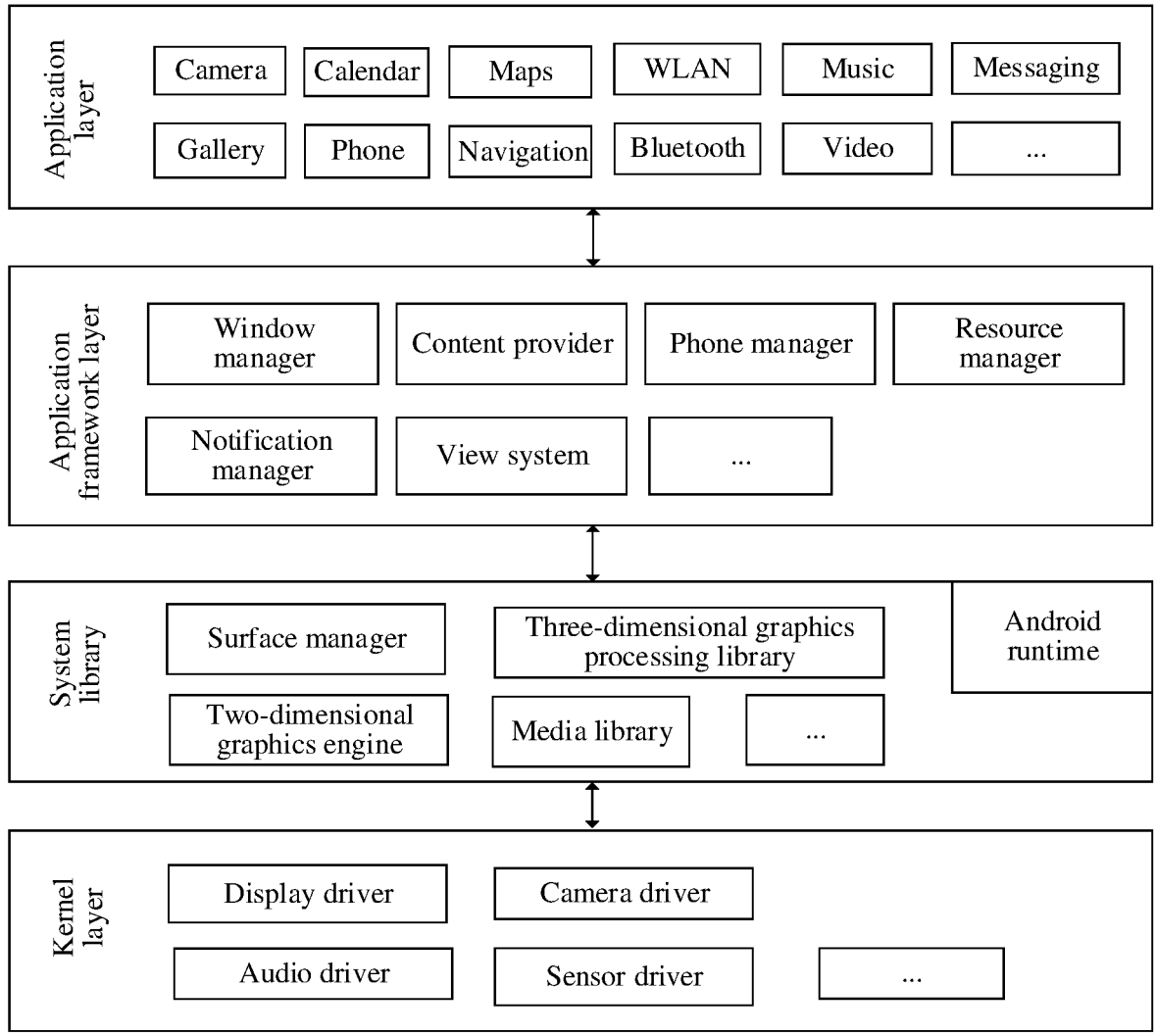
FIG. 2 is a schematic diagram of a software architecture to which a collaborative display method is applicable according to an embodiment of this application.

FIG. 2 is a block diagram of a software structure of a terminal device 100 according to this embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Video, and Messaging.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, and determine whether there is a status bar, a lock screen, a screen capture, or the like.

The content provider is configured to store and obtain data, so that the data can be accessed by an application. The data may include a video, an image, audio, a made call, an answered call, a browsing history and bookmark, a phonebook, and the like.

The view system includes visual controls such as a control for displaying a text and a control for displaying an image. The view system may be configured to construct an application. A display interface may include one or more views. For example, a display interface including a Messaging notification icon may include a text display view and an image display view.

The phone manager is configured to provide a communication function for the terminal device 100, for example, management of a call status (including answering, declining, or the like).

The resource manager provides various resources for the application, for example, a localized string, an icon, a picture, a layout file, and a video file.

The notification manager enables the application to display notification information in the status bar, and may be configured to convey a notification-type message. The displayed notification information may automatically disappear after a short pause without a need to perform user interaction. For example, the notification manager is configured to notify download completion, provide a message notification, and the like. The notification manager may further be a notification that appears in a top status bar of a system in a form of a graph or a scroll bar text, for example, a notification of an application running in the background, or may be a notification that appears on a screen in a form of a dialog window. For example, text information is prompted in the status bar, a prompt tone is produced, the terminal device vibrates, or an indicator blinks.

Android runtime includes a core library and a virtual machine. The Android runtime is responsible for scheduling and management of the Android system.

The core library includes two parts: One part is a function that needs to be called in java language, and the other part is a core library of Android.

The application layer and the application framework layer run on the virtual machine. The virtual machine converts a java file at the application layer and the application framework layer into a binary file for execution. The virtual machine is configured to perform functions such as object lifecycle management, stack management, thread management, security and abnormality management, and garbage collection.

The system library may include a plurality of functional modules such as a surface manager, a media library, a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording of a plurality of common audio and video formats, a static image file, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to a scenario in which capturing and photographing are performed, the following describes an example of a working procedure of software and hardware of a terminal device 100.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is opened. Then, a camera driver is started by invoking the kernel layer, and a static image or a video is captured through the camera 193.

The following describes in detail the collaborative display method provided in embodiments of this application with reference to the accompanying drawings.

Figure 3:
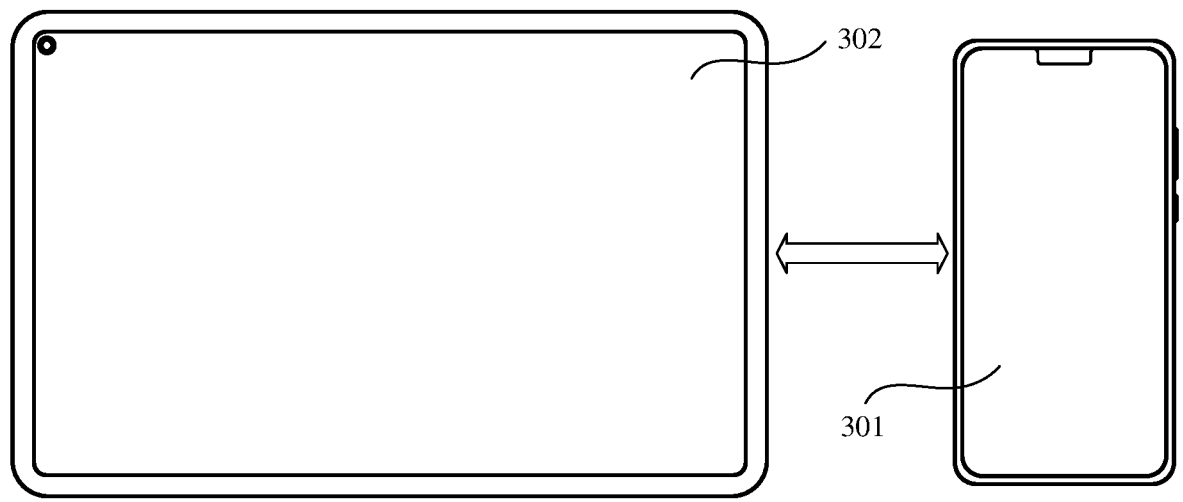
FIG. 3 is a schematic diagram of a system according to an embodiment of this application.

As shown in FIG. 3, a collaborative display method provided in an embodiment of this application may be applied to a communication system 300. The communication system 300 may include a first terminal device 301 and a second terminal device 302. The first terminal device 301 and the second terminal device 302 each may be a terminal device with a display, for example, a mobile phone, a tablet computer, a wearable device, a vehicle-mounted device, an AR/VR device, a notebook computer, a UMPC, a netbook, a PDA, a desktop computer, or a smart television. A size of a display of the second terminal device 302 is greater than a size of a display of the first terminal device 301, so that the second terminal device 302 can simultaneously and collaboratively display a plurality of applications in the first terminal device 301.

During collaborative display, a connection between the first terminal device 301 and the second terminal device 302 needs to be established, to implement data exchange between the first terminal device 301 and the second terminal device 302, so that the second terminal device 302 can collaboratively display the application in the first terminal device 301. For example, the first terminal device 301 and the second terminal device 302 may establish a connection through one tap, close range auto-discovery, scanning, or the like.

Figure 4:
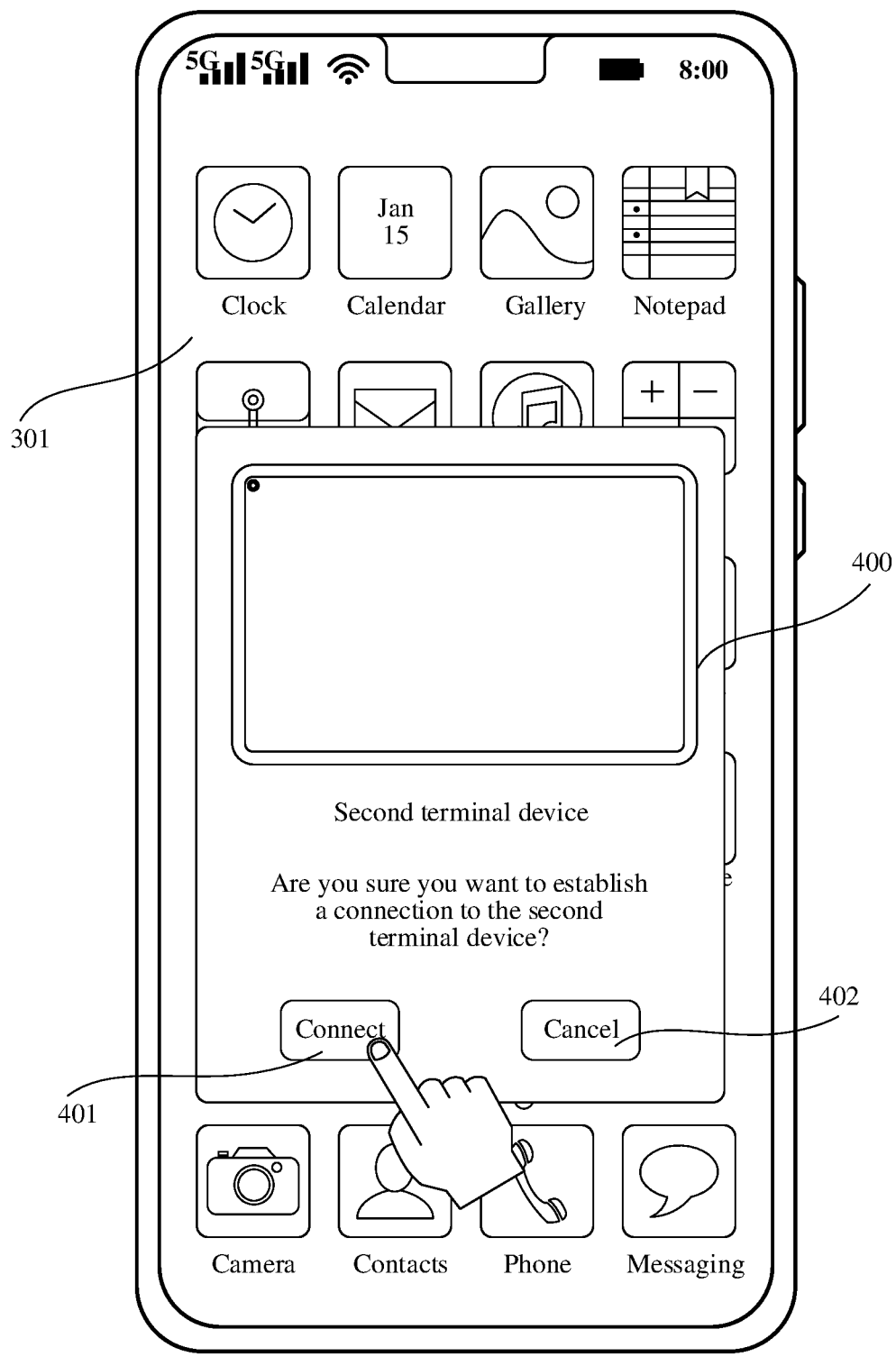
Figures 2, 5:
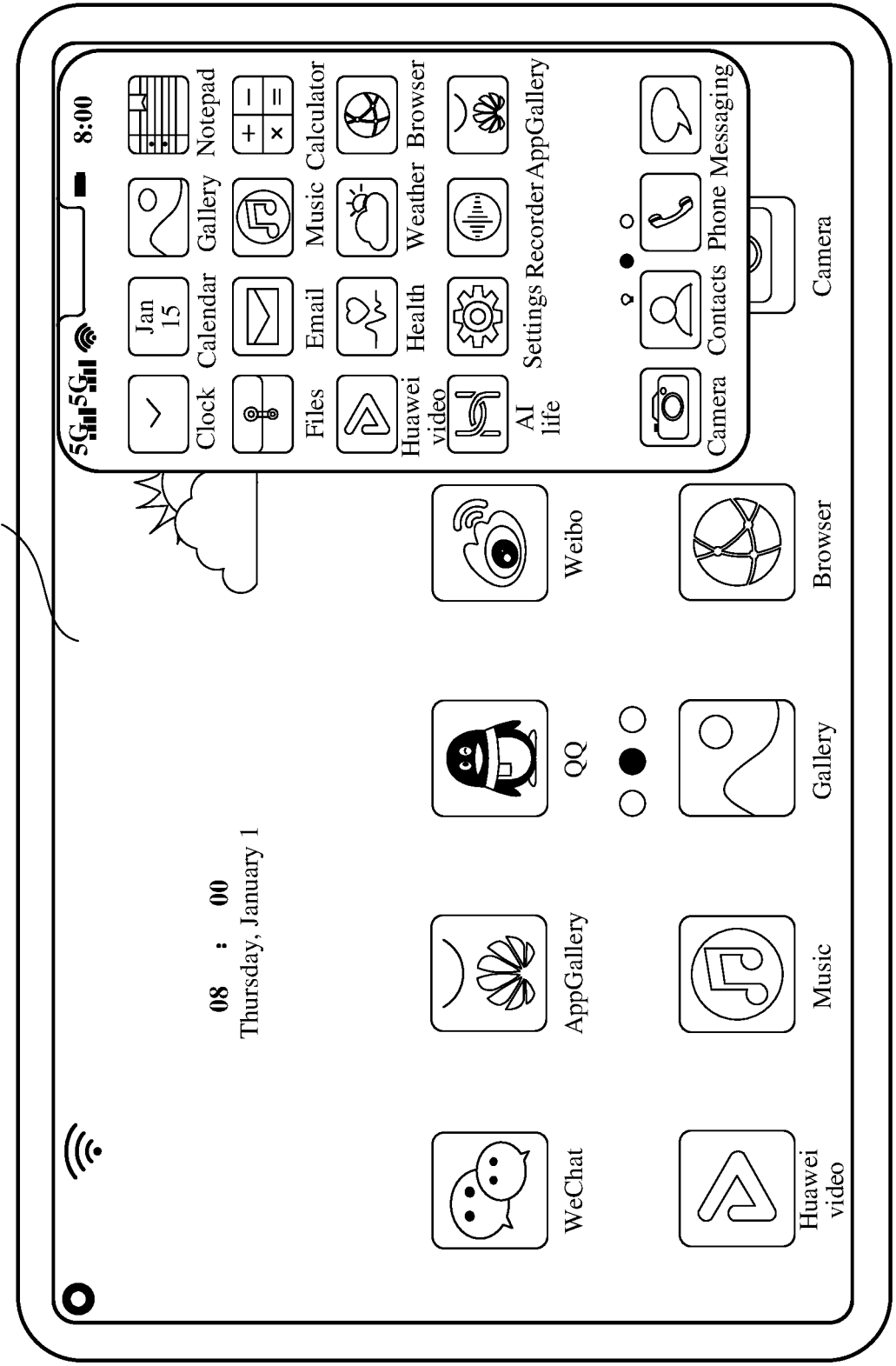

FIG. 4 and FIG. 5-1 and FIG. 5-2 are schematic diagrams of establishing a connection between a first terminal device and a second terminal device. In a connection established through one tap, the first terminal device 301 and the second terminal device 302 each are a terminal device with an NFC chip. When an NFC function of the first terminal device 301 and an NFC function of the second terminal device 302 are both enabled, a user may use a first preset region in which an NFC chip of the first terminal device 301 is located to touch a second preset region in which an NFC chip of the second terminal device 302 is located. As shown in FIG. 4, in this case, the first terminal device 301 may pop up a pop-up connection box 400 of "Are you sure you want to establish a connection to the second terminal device 302", and the pop-up connection box 400 may further display a "Connect" button 401 and a "Cancel" button 402. The "Connect" button 401 may be configured to send a connection request to the second terminal device 302. The "Cancel" button 402 may be configured to cancel a connection operation between the first terminal device 301 and the second terminal device 302. When the user taps or touches the "Connect" button 401 in the first terminal device 301, the first terminal device 301 may send the connection request to the second terminal device 302. As shown in (a) in FIG. 5-1 and FIG. 5-2, the second terminal device 302 may pop up a pop-up confirmation box 500 of "Are you sure you want to allow a connection to a first terminal device 301", and the pop-up confirmation box 500 may further display an "Allow" button 501 and a "Reject" button 502. The "Allow" button 501 may be configured to establish a connection to the first terminal device 301. The "Reject" button 502 may be configured to reject a connection to the first terminal device 301. When the user taps or touches the "Allow" button 501 in the second terminal device 302, the second terminal device 302 confirms to establish a connection to the first terminal device 301. After the first terminal device 301 establishes a connection to the second terminal device 302, as shown in (b) in FIG. 5-1 and FIG. 5-2, a display interface of the second terminal device 302 may display content displayed in the first terminal device 301, for example, display a home screen of the first terminal device 301. The home screen may include application icons of applications such as Clock, Calendar, Gallery, Notepad, Files, Email, Music, Calculator, Huawei video, Health, Weather, Camera, and Messaging. In addition, the user may collaboratively operate the first terminal device 301 in the second terminal device 302, for example, tap or touch an application icon of the first terminal device 301 in the display interface of the second terminal device 302, to open an application of the first terminal device 301.

Similarly, in a connection established through close range auto-discovery, when a distance between the first terminal device 301 and the second terminal device 302 is less than a preset distance, a connection between the first terminal device 301 and the second terminal device 302 is established based on operations in FIG. 4 and FIG. 5-1 and FIG. 5-2. Similarly, in a connection established through scanning, after the first terminal device 301 scans a two-dimensional code that is in the second terminal device 302 and that is used for a connection, a connection between the first terminal device 301 and the second terminal device 302 is established based on operations in FIG. 4 and FIG. 5-1 and FIG. 5-2.

In an example, after the user enables multi-screen collaboration of the first terminal device 301 to establish a connection between the first terminal device 301 and the second terminal device 302, the first terminal device 301 may determine a first display region of the home screen of the first terminal device 301 in the display interface of the second terminal device 302, and may send display information of the home screen and location information of the first display region to the second terminal device 302. The second terminal device 302 may display the home screen of the first terminal device 301 in the first display region in the display interface of the second terminal device 302. In other words, the first terminal device 301 may project the home screen onto the first display region in the second terminal device 302. The home screen is a screen on which the first terminal device 301 displays content. In other words, the first display region in the display interface of the second terminal device 302 may synchronously display content currently displayed in a display interface of the first terminal device 301, for example, may synchronously display the home screen of the first terminal device 301.

When the user opens an application (for example, the Huawei video application) of the first terminal device 301 in the second terminal device 302, the second terminal device 302 may send, to the first terminal device 301, an instruction of the user for opening the Huawei video application. After receiving the instruction, the first terminal device 301 may create a virtual screen, and may determine a second display region of the virtual screen in the display interface of the second terminal device 302. In addition, the first terminal device 301 may obtain application data of the Huawei video application, render the application data of the Huawei video application to obtain window data, and may combine the window data and then display the window data on the virtual screen, that is, may open the Huawei video application on the virtual screen of the first terminal device 301. Subsequently, the first terminal device 301 may send display information of the virtual screen and location information of the second display region to the second terminal device 302. The second terminal device 302 may display the virtual screen in the second display region in the display interface of the second terminal device 302. For example, an application interface of the Huawei video application may be displayed in the second display region in the display interface of the second terminal device 302. In other words, the first terminal device 301 may project the virtual screen onto the second display region in the second terminal device 302.

In another example, after the user enables multi-screen collaboration of the first terminal device 301 to establish a connection between the first terminal device 301 and the second terminal device 302, the first terminal device 301 may send display information of the home screen to the second terminal device 302. The second terminal device 302 may determine a first display region of the home screen of the first terminal device 301 in the display interface of the second terminal device 302, and then may display the home screen in the first display region in the display interface of the second terminal device 302.

When the user opens an application of the first terminal device 301 in the second terminal device 302, the second terminal device 302 may send, to the first terminal device 301, an instruction of the user for opening the application. After receiving the instruction, the first terminal device 301 may create a virtual screen, obtain application data of the application, render application data of the application to obtain window data, and combine the window data and then display the combined window data on the virtual screen, that is, open the application on the virtual screen of the first terminal device 301. Subsequently, the first terminal device 301 may send display information of the virtual screen to the second terminal device 302. The second terminal device 302 may determine a second display region of the virtual screen of the first terminal device 301 in the display interface of the second terminal device 302, and then may display the virtual screen in the second display region in the display interface of the second terminal device 302, that is, may display an application interface of the application in the second display region in the display interface of the second terminal device 302.

Content displayed on the virtual screen may not be displayed on the home screen of the first terminal device 301. In other words, the virtual screen may not be displayed in the first terminal device 301. The first terminal device 301 may create the virtual screen based on a current screen parameter of the home screen. The screen parameter may include a screen size, a display state of the screen, and the like. The current screen parameter of the home screen is a screen parameter that is of the home screen and that exists when the virtual screen is created. However, the virtual screen is independent of the home screen. To be specific, although the virtual screen is created based on the screen parameter of the home screen, a screen parameter of the virtual screen is independent of the screen parameter of the home screen. In other words, the screen parameter of the virtual screen does not change with the screen parameter of the home screen. For example, after the virtual screen in a portrait-mode display state is created based on the home screen in a portrait-mode display state, when the home screen changes from the portrait-mode display state to a landscape-mode display state, the screen parameter of the virtual screen may still retain a current screen parameter of the virtual screen. In other words, the virtual screen may still retain the current portrait-mode display state, instead of changing to the landscape-mode display state.

It should be noted that, there is no overlapping relationship between the first display region and the second display region, to ensure that the home screen and the virtual screen do not block each other when being displayed in the second terminal device 302, improve a display effect of performing collaborative display by the second terminal device 302, and improve user experience.

It can be learned from the foregoing descriptions that, in this embodiment of this application, the first display region and the second display region may be determined by the first terminal device 301, or may be determined by the second terminal device 302. A principle of determining the first display region and the second display region by the first terminal device 301 is basically the same as a principle of determining the first display region and the second display region by the second terminal device 302. The following provides descriptions by using an example in which the first terminal device 301 determines the first display region and the second display region.

In this embodiment of this application, the first terminal device 301 may determine the first display region and the second display region based on a display state of the first terminal device 301 and interface information of the display interface of the second terminal device 302. For an unfoldable first terminal device 301, a display state may include a landscape-mode display state and a portrait-mode display state. For a foldable first terminal device 301, a display state may further include a folded-screen display state and an unfolded-screen display state. The following separately describes the following steps: (1) Determine a first display region and a second display region when the unfoldable first terminal device 301 is in the landscape-mode display state. (2) Determine a first display region and a second display region when the unfoldable first terminal device 301 is in the portrait-mode display state. (3) Determine a first display region and a second display region when the foldable first terminal device 301 is in the folded-screen display state. (4) Determine a first display region and a second display region when the foldable first terminal device 301 is in the unfolded-screen display state.

A display state of the first terminal device 301 may be obtained in an existing method. This is not specifically limited in this embodiment of this application. For example, the display state of the first terminal device 301 may be obtained from an activity task manager service (activity task manager service, ATMS) in the first terminal device 301 by using a window manager in the first terminal device 301. The ATMS is configured to manage a status of all activities (activity) in the system.

(1) Determine the first display region and the second display region when the unfoldable first terminal device 301 is in the portrait-mode display state.

Specifically, when the unfoldable first terminal device 301 is in the portrait-mode display state, after the first terminal device 301 establishes a connection to the second terminal device 302, the first terminal device 301 may obtain the interface information of the display interface of the second terminal device 302, where the interface information of the display interface may include a current interface height, a current interface width, and the like of the display interface, and may vertically divide the display interface of the second terminal device 302 based on a current screen width of the home screen of the first terminal device 301 and the interface information of the second terminal device 302, to obtain a first display region and a second display region that are arranged in a left-right form. A region height of the first display region and a region height of the second display region are the same and both are the same as the current interface height of the second terminal device 302, and a sum of a region width of the first display region and a region width of the second display region is the current interface width of the second terminal device 302. Optionally, the region width of the first display region may be the same as the current screen width of the home screen of the first terminal device 301.

Figure 6:
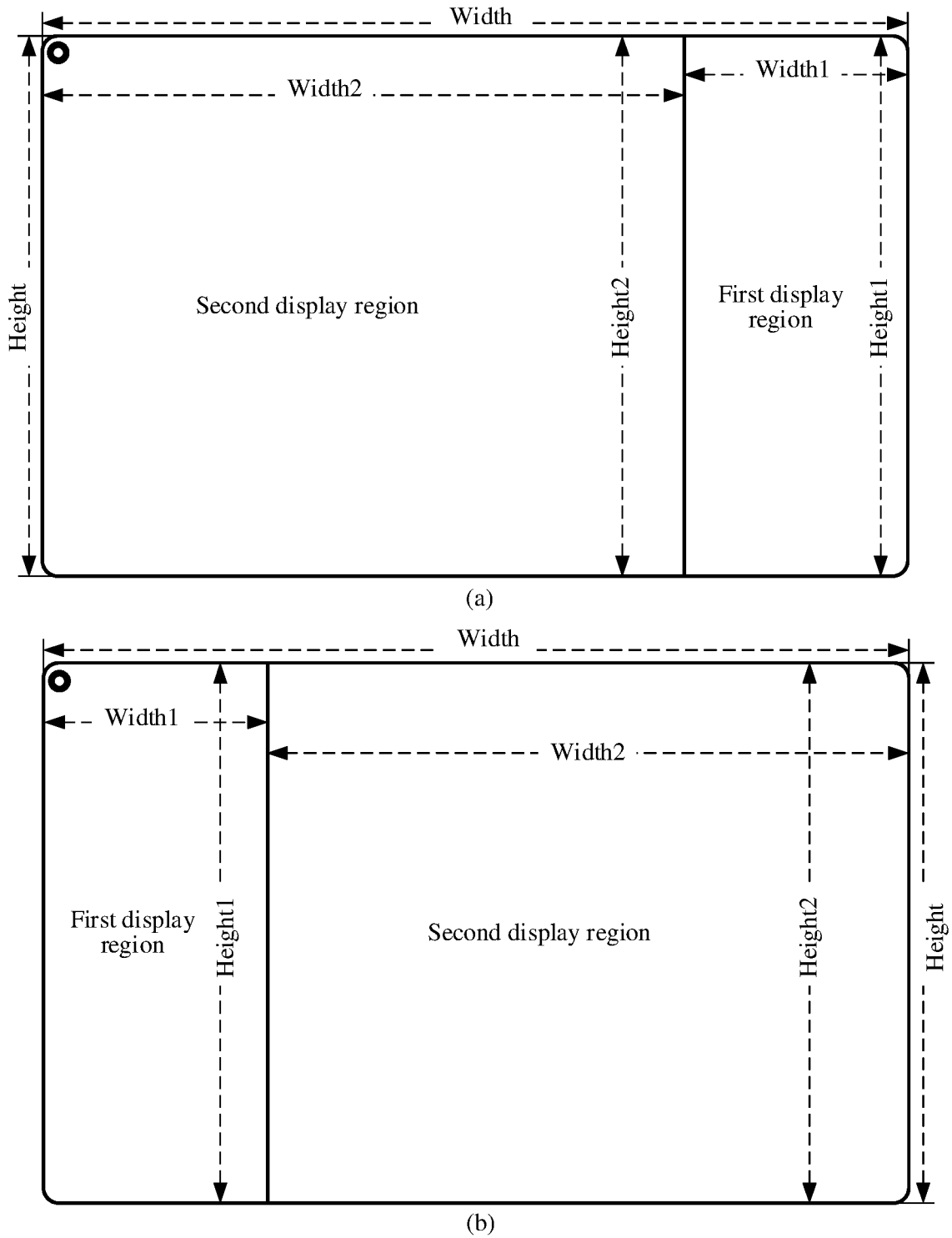
FIG. 6 is an example diagram 1 of determining a first display region and a second display region.
Figure 7:
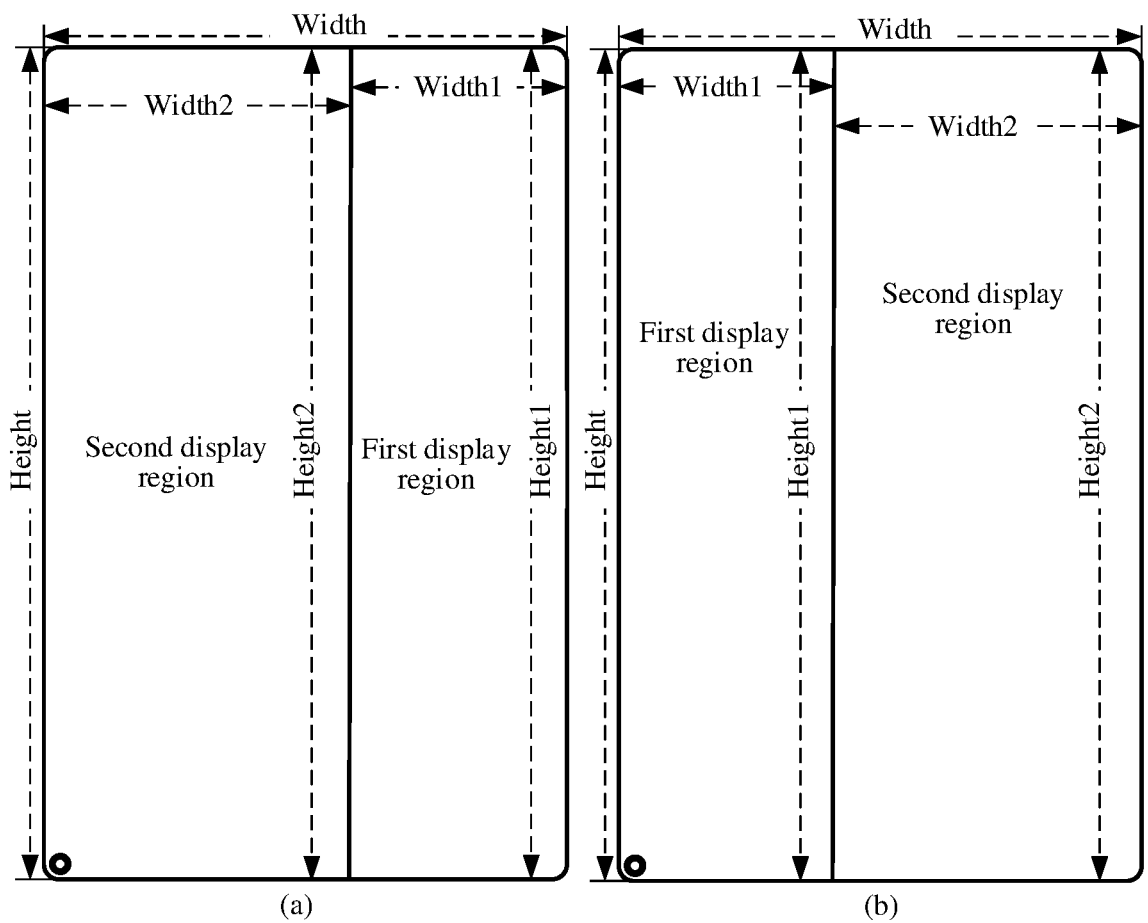
FIG. 7 is an example diagram 2 of determining a first display region and a second display region.

It should be understood that, the first display region and the second display region that are arranged in the left-right form and that are obtained by vertically dividing the display interface of the second terminal device 302 based on the current screen width of the home screen of the first terminal device 301 and the interface information of the second terminal device 302 may be that the first display region is on a right side and the second display region is on a left side, as shown in (a) in FIG. 6 and (a) in FIG. 7; or may be that the first display region is on a left side and the second display region is on a right side, as shown in (b) in FIG. 6 and (b) in FIG. 7. (a) in FIG. 6 and (b) in FIG. 6 are example diagrams of a first display region and a second display region when a first terminal device 301 is in a portrait-mode display state and a second terminal device 302 is in a landscape-mode display state. (a) in FIG. 7 and (b) in FIG. 7 are example diagrams of a first display region and a second display region when a first terminal device 301 is in a portrait-mode display state and a second terminal device 302 is in a portrait-mode display state.

After obtaining the first display region and the second display region through division, the first terminal device 301 may represent location information of the first display region by using coordinate information of an upper left vertex and a lower right vertex of the first display region, and may represent location information of the second display region by using coordinate information of an upper left vertex and a lower right vertex of the second display region. The coordinate information is coordinate information in a coordinate system established by using an upper left vertex of the display interface of the second terminal device 302 as an origin of coordinates (or using a point of intersection between an upper edge of the display interface of the second terminal device 302 and a left edge of the display interface as an origin of coordinates), using the upper edge of the display interface of the second terminal device 302 as an X axis, and using the left edge of the display interface of the second terminal device 302 as a Y axis.

Therefore, the location information of the first display region may be [(region width of the second display region, 0), (interface width of the display interface, interface height of the display interface)], and the location information of the second display region is [(0, 0), (region width of the second display region, interface height of the display interface)]. Alternatively, the location information of the first display region may be [(0, 0), (region width of the first display region, interface height of the display interface)], and the location information of the second display region is [(region width of the first display region, 0), (interface width of the display interface, interface height of the display interface). Herein, the display interface is the display interface of the second terminal device 302.

For example, as shown in (a) in FIG. 6, when the first terminal device 301 is in the portrait-mode display state and the second terminal device 302 is in the landscape-mode display state, the first display region may be a right region in the display interface of the second terminal device 302, and the second display region may be a left region in the display interface of the second terminal device 302. In other words, the home screen and the virtual screen may be horizontally arranged in a left-right form in the display interface of the second terminal device 302. Region height height1 of the first display region=Region height height2 of the second display region=Interface height height of the display interface, Region width width1 of the first display region+Region width width2 of the second display region=Interface width width of the display interface, and Region width width1 of the first display region=Current screen width of the home screen of the first terminal device 301. Therefore, the location information of the first display region may be [(width2, 0), (width, height)], and the location information of the second display region may be [(0, 0), (width2, height)].

For example, as shown in (b) in FIG. 7, when the first terminal device 301 is in the portrait-mode display state and the second terminal device 302 is in the portrait-mode display state, the first display region may be a left region in the display interface of the second terminal device 302, and the second display region may be a right region in the display interface of the second terminal device 302. Therefore, the location information of the first display region may be [(0, 0), (width1, height)], and the location information of the second display region may be [(widths, 0), (width, height)].

It should be noted that, that coordinate information of an upper left vertex and a lower right vertex of a display region (including the first display region and the second display region) is used to represent location information of the display region is merely used for an example explanation, and should not be construed as a limitation on this embodiment of this application. In this embodiment of this application, the location information of the display region may be represented by using coordinate information of four vertices of the display region, coordinate information of a lower left vertex and an upper right vertex of the display region, or the like.

(2) Determine the first display region and the second display region when the unfoldable first terminal device 301 is in the landscape-mode display state.

Specifically, when the unfoldable first terminal device 301 is in the landscape-mode display state, after the first terminal device 301 establishes a connection to the second terminal device 302, the first terminal device 301 may obtain the interface information of the display interface of the second terminal device 302, where the interface information of the display interface may include a current interface height, a current interface width, and the like of the display interface, and may horizontally divide the display interface of the second terminal device 302 based on a current screen height of the home screen of the first terminal device 301 and the interface information of the second terminal device 302, to obtain a first display region and a second display region that are arranged in an up-down form. A region width of the first display region and a region width of the second display region are the same and both are the same as the current interface width of the second terminal device 302, and a sum of a region height of the first display region and a region height of the second display region is the current interface height of the second terminal device 302. Optionally, the region height of the first display region may be the same as the current screen height of the home screen of the first terminal device 301.

Figure 8:
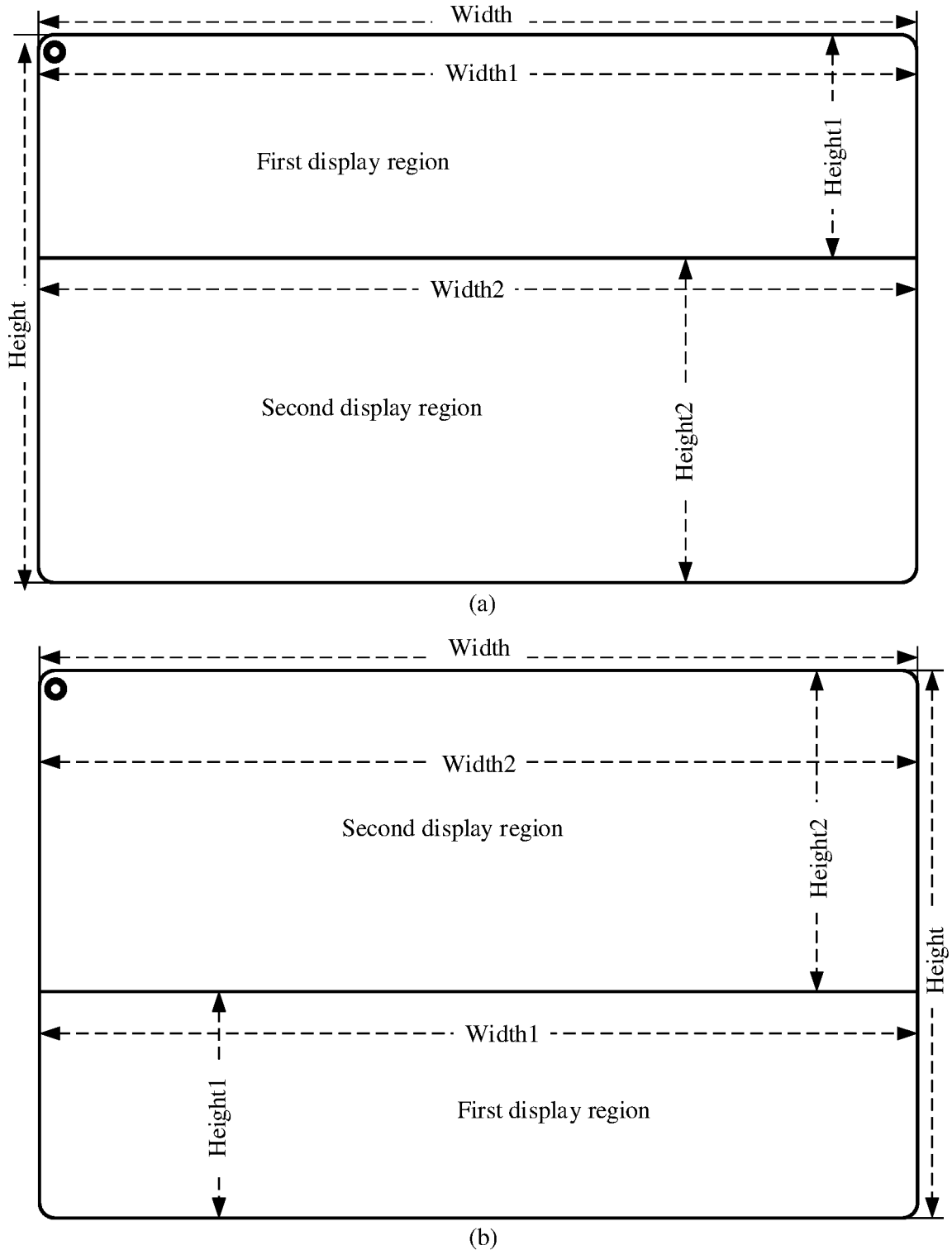
FIG. 8 is an example diagram 3 of determining a first display region and a second display region.
Figure 9:
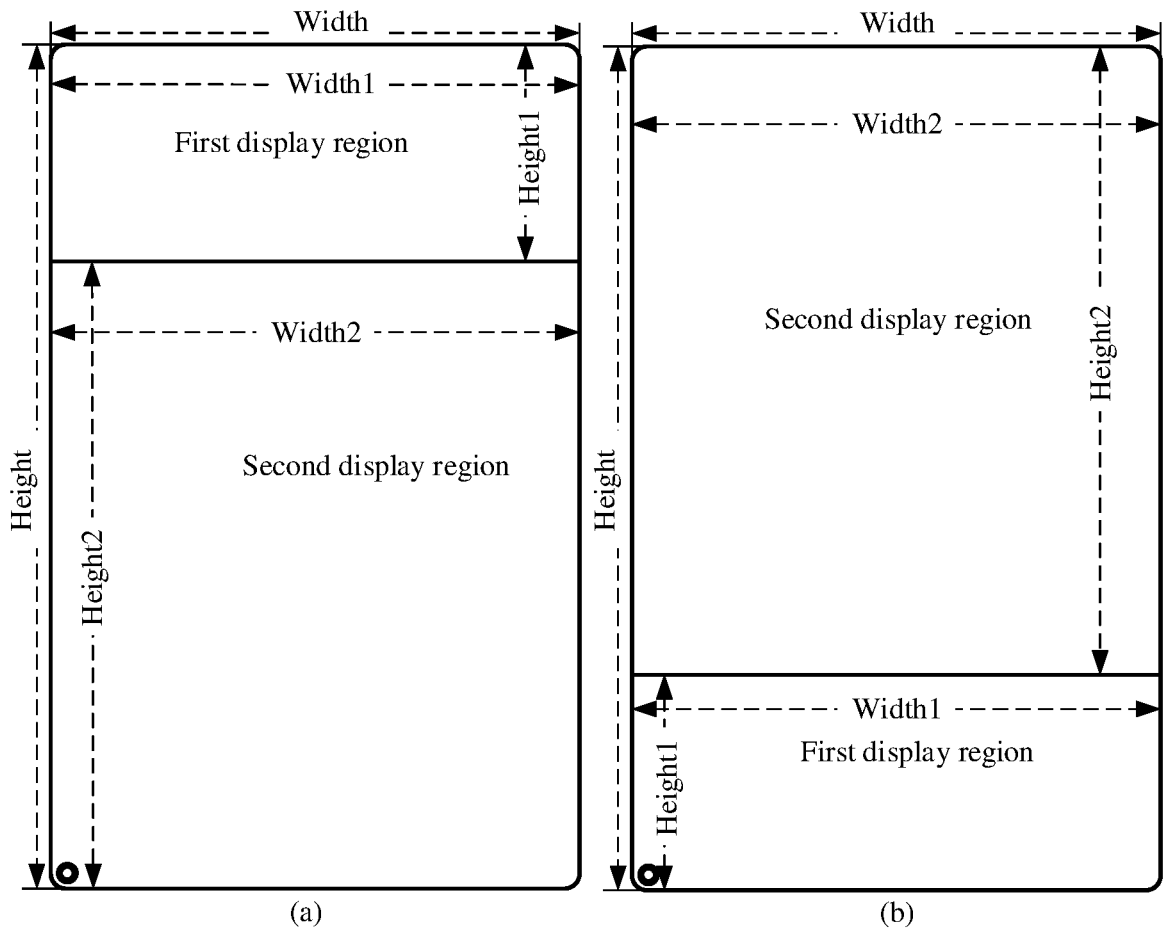
FIG. 9 is an example diagram 4 of determining a first display region and a second display region.

It should be understood that, the first display region and the second display region that are arranged in the up-down form and that are obtained by horizontally dividing the display interface of the second terminal device 302 based on the current screen height of the home screen of the first terminal device 301 and the interface information of the second terminal device 302 may be that the first display region is on an upper side and the second display region is on a lower side, as shown in (a) in FIG. 8 and (a) in FIG. 9; or may be that the first display region is on a lower side and the second display region is on an upper side, as shown in (b) in FIG. 8 and (b) in FIG. 9. (a) in FIG. 8 and (b) in FIG. 8 are example diagrams of a first display region and a second display region when a first terminal device 301 is in a landscape-mode display state and a second terminal device 302 is in a landscape-mode display state. (a) in FIG. 9 and (b) in FIG. 9 are example diagrams of a first display region and a second display region when a first terminal device 301 is in a landscape-mode display state and a second terminal device 302 is in a portrait-mode display state.

Similar to (1), after obtaining the first display region and the second display region through division, the first terminal device 301 may represent location information of the first display region by using coordinate information of an upper left vertex and a lower right vertex of the first display region, and may represent location information of the second display region by using coordinate information of an upper left vertex and a lower right vertex of the second display region. Similarly, the coordinate information is coordinate information in a coordinate system established by using an upper left vertex of the display interface of the second terminal device 302 as an origin of coordinates (or using a point of intersection between an upper edge of the display interface of the second terminal device 302 and a left edge of the display interface as an origin of coordinates), using the upper edge of the display interface of the second terminal device 302 as an X axis, and using the left edge of the display interface of the second terminal device 302 as a Y axis.

Therefore, the location information of the first display region may be [(0, 0), (interface width of the display interface, region height of the first display region)], and the location information of the second display region is [(0, region height of the first display region), (interface width of the display interface, interface height of the display interface)]. Alternatively, the location information of the first display region may be [(0, region height of the second display region), (interface width of the display interface, interface height of the display interface)], and the location information of the second display region is [(0, 0), (interface width of the display interface, region height of the second display region)]. Herein, the display interface is the display interface of the second terminal device 302.

For example, as shown in (a) in FIG. 8, when the first terminal device 301 is in the landscape-mode display state and the second terminal device 302 is in the landscape-mode display state, the first display region may be an upper region in the display interface of the second terminal device 302, and the second display region may be a lower region in the display interface of the second terminal device 302. In other words, the home screen and the virtual screen may be vertically arranged in an up-down form in the display interface of the second terminal device 302. Region width widths of the first display region=Region width width2 of the second display region=Interface width width of the display interface, Region height height1 of the first display region+Region height height2 of the second display region=Interface height height of the display interface, and Region height height1 of the first display region=Current screen height of the home screen of the first terminal device 301. Therefore, the location information of the first display region may be [(0, 0), (width, heights)], and the location information of the second display region may be [(0, height1), (width, height)].

For example, as shown in (b) in FIG. 9, when the first terminal device 301 is in the landscape-mode display state and the second terminal device 302 is in the portrait-mode display state, the first display region may be a lower region in the display interface of the second terminal device 302, and the second display region may be an upper region in the display interface of the second terminal device 302. Therefore, the location information of the first display region may be [(0, height2), (width, height)], and the location information of the second display region may be [(0, 0), (width, height2)].

(3) Determine the first display region and the second display region when the foldable first terminal device 301 is in the folded-screen display state.

It should be understood that, in a scenario in which the foldable first terminal device 301 is in the folded-screen display state, when the foldable first terminal device 301 is in the portrait-mode display state, the first terminal device 301 may determine the first display region and the second display region in a manner in (1). To be specific, the first terminal device 301 may vertically divide the display interface of the second terminal device 302 based on a current screen width of the home screen of the first terminal device 301 and the interface information of the second terminal device 302, to obtain the first display region and the second display region that are arranged in a left-right form.

When the foldable first terminal device 301 is in the landscape-mode display state, the first terminal device 301 may determine the first display region and the second display region in a manner in (2). To be specific, the first terminal device 301 may horizontally divide the display interface of the second terminal device 302 based on a current screen height of the home screen of the first terminal device 301 and the interface information of the second terminal device 302, to obtain the first display region and the second display region that are arranged in an up-down form.

(4) Determine the first display region and the second display region when the foldable first terminal device 301 is in the unfolded-screen display state.

Specifically, when the foldable first terminal device 301 is in the unfolded-screen display state, the home screen of the first terminal device 301 becomes larger correspondingly, and an area of the first display region also needs to become larger correspondingly. The first terminal device 301 may determine the first display region and the second display region with reference to a display state of the second terminal device 302, to fully use the display interface of the second terminal device 302 and improve utilization of the display interface of the second terminal device 302.

The display state of the second terminal device 302 may be determined based on the interface information of the display interface of the second terminal device 302. For example, when a current screen width of the display interface is greater than a current screen height, it may be determined that the second terminal device 302 is in the landscape-mode display state. When the current screen width of the display interface is less than the current screen height, it may be determined that the second terminal device 302 is in the portrait-mode display state.

In an example, when the second terminal device 302 is in the landscape-mode display state, the first terminal device 301 may determine the first display region and the second display region with reference to a manner in (1). To be specific, the first terminal device 301 may vertically divide the display interface of the second terminal device 302 based on a current screen width of the home screen of the first terminal device 301 and the interface information of the second terminal device 302, to obtain the first display region and the second display region that are arranged in a left-right form, so that a display area of the second display region is ensured, and more virtual screens can be displayed in the second display region, to improve utilization of the display interface of the second terminal device 302 and improve user experience. Similar to (1), the first display region and the second display region that are arranged in the left-right form and that are obtained by vertically dividing the display interface of the second terminal device 302 based on the current screen width of the home screen of the first terminal device 301 and the interface information of the second terminal device 302 may be that the first display region is on a left side and the second display region is on a right side; or may be that the first display region is on a right side and the second display region is on a left side.

Therefore, the location information of the first display region may be [(0, 0), (region width of the first display region, interface height of the display interface)], and the location information of the second display region is [(region width of the first display region, 0), (interface width of the display interface, interface height of the display interface). Alternatively, the location information of the first display region may be [(region width of the second display region, 0), (interface width of the display interface, interface height of the display interface)], and the location information of the second display region is [(0, 0), (region width of the second display region, interface height of the display interface)].

In another example, when the second terminal device 302 is in the portrait-mode display state, the first terminal device 301 may determine the first display region and the second display region with reference to a manner in (2). To be specific, the first terminal device 301 may horizontally divide the display interface of the second terminal device 302 based on a current screen height of the home screen of the first terminal device 301 and the interface information of the second terminal device 302, to obtain the first display region and the second display region that are arranged in an up-down form, so that a display area of the second display region is ensured, and more virtual screens can be displayed in the second display region, to improve utilization of the display interface of the second terminal device 302 and improve user experience. Similar to (2), the first display region and the second display region that are arranged in the up-down form and that are obtained by horizontally dividing the display interface of the second terminal device 302 based on the current screen height of the home screen of the first terminal device 301 and the interface information of the second terminal device 302 may be that the first display region is on an upper side in the display interface and the second display region is on a lower side in the display interface; or may be that the first display region is on a lower side in the display interface and the second display region is on an upper side in the display interface.

Therefore, the location information of the first display region may be [(0, 0), (interface width of the display interface, region height of the first display region)], and the location information of the second display region is [(0, region height of the first display region), (interface width of the display interface, interface height of the display interface). Alternatively, the location information of the first display region may be [(0, region height of the second display region), (interface width of the display interface, interface height of the display interface)], and the location information of the second display region is [(0, 0), (interface width of the display interface, region height of the second display region)].

In a possible implementation, in a scenario in which the first terminal device 301 is in the unfolded-screen display state, when a difference between a screen width of the home screen and a screen height of the home screen is less than a preset threshold, the first terminal device 301 may directly determine the region width of the first display region based on a larger one in the screen width of the home screen and the screen height of the home screen. In other words, when the first terminal device 301 is in the landscape-mode display state, the first terminal device 301 may determine a larger value (for example, the current screen height of the home screen) in the current screen height and the current screen height of the home screen as the region width of the first display region. When the first terminal device 301 is in the portrait-mode display state, the first display region and the second display region remain the same as the first display region and the second display region that exist when the first terminal device 301 is in the landscape-mode display state. Therefore, when the first terminal device 301 changes from the landscape-mode display state to the portrait-mode display state, the first display region and the second display region do not need to be reorganized, to reduce an operation delay and improve a display effect. The preset threshold may be specifically set based on an actual situation.

In this embodiment of this application, after the first display region and the second display region are determined, the second terminal device 302 may display the home screen in the first display region, and may display the virtual screen in the second display region. It should be understood that, when the home screen is displayed in the first display region, a relative location of the home screen in the first display region needs to be first determined, so that the second terminal device 302 can display the home screen in the first display region based on the relative location.

The relative location of the home screen in the first display region may be set by the first terminal device 301 or the second terminal device 302 by default, or may be customized by the user in the first terminal device 301 or the second terminal device 302. When the relative location of the home screen in the first display region is set by the first terminal device 301 by default or is customized by the user in the first terminal device 301, the first terminal device 301 may send the relative location of the home screen in the first display region to the second terminal device 302 when sending the display information of the home screen or the display information of the home screen and the location information of the first display region to the second terminal device 302.

Similarly, when the virtual screen is displayed in the second display region, a relative location of the virtual screen in the second display region needs to be first determined, so that the second terminal device 302 can display the virtual screen in the second display region based on the relative location. The relative location of the virtual screen in the second display region may be set by the first terminal device 301 or the second terminal device 302 by default, or may be customized by the user in the first terminal device 301 or the second terminal device 302. When the relative location of the virtual screen in the second display region is set by the first terminal device 301 by default or customized by the user in the first terminal device 301, the first terminal device 301 may send the relative location of the virtual screen in the second display region when sending the display information of the virtual screen or the display information of the virtual screen and the location information of the second display region to the second terminal device 302.

In a possible implementation, relative locations of virtual screens in the second display region may alternatively be determined based on an arrangement sequence of the virtual screens in the second display region. The arrangement sequence may be set by the first terminal device 301 or the second terminal device 302 by default, or may be customized by the user in the first terminal device 301 or the second terminal device 302. For example, the second terminal device 302 may set, by default, that the virtual screens are displayed in a left-to-right arrangement sequence. Therefore, when the second terminal device 302 receives display information that is of a first virtual screen and that is sent by the first terminal device 301, the second terminal device 302 may display the first virtual screen at a leftmost location in the second display region. Subsequently, when the second terminal device 302 receives display information that is of a second virtual screen and that is sent by the first terminal device 301, the second terminal device 302 may display the second virtual screen on the right of the first virtual screen, and so on, until no virtual screen can be added to the second display region for display, or until a quantity of virtual screens displayed in the second display region reaches a preset maximum quantity. The preset maximum quantity may be customized by the user.

In this embodiment of this application, during collaborative display performed by using the second terminal device 302, when the display state of the first terminal device 301 changes, a state of the home screen displayed in the second terminal device 302 also changes correspondingly. Therefore, the first display region and the second display region may be reorganized, the home screen may be displayed in a reorganized first display region, and the virtual screen may be displayed in a reorganized second display region, to improve a display effect of the home screen in the second terminal device 302 and improve user experience. The first display region and the second display region may be reorganized by the first terminal device 301 or the second terminal device 302. The following provides descriptions by using an example in which the first terminal device 301 reorganizes the first display region and the second display region.

Figure 10:
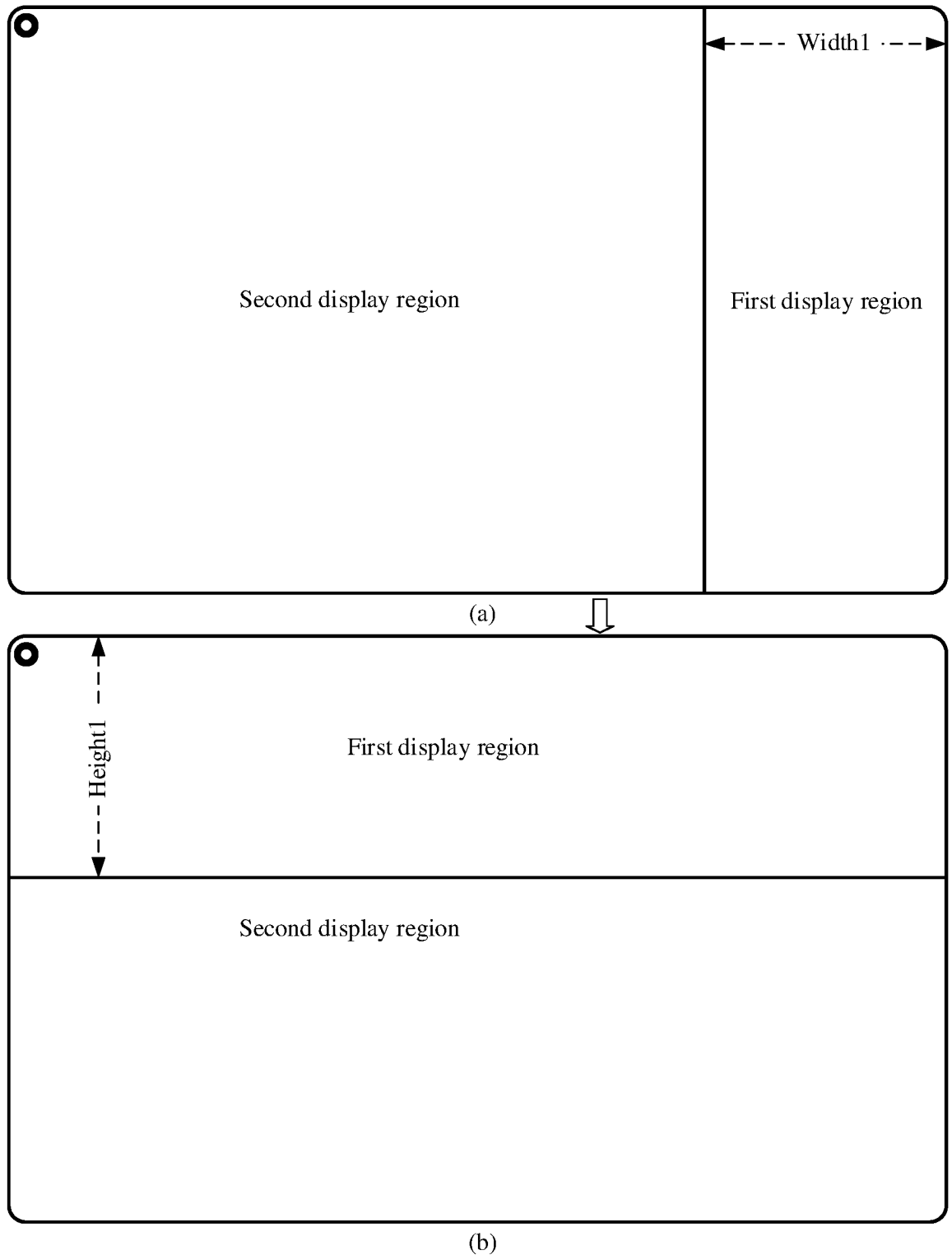
FIG. 10 is an example diagram 1 of reorganizing a first display region and a second display region.

Specifically, when the first terminal device 301 changes from the portrait-mode display state to the landscape-mode display state, the first terminal device 301 may reorganize the first display region and the second display region with reference to the manner in (2). To be specific, a first display region and a second display region that are arranged in a left-right form may be reorganized into a first display region and a second display region that are arranged in an up-down form. A region width of the first display region existing before reorganization is equal to a region height of the reorganized first display region. For example, the first terminal device 301 may reorganize, into a first display region and a second display region that are arranged in an up-down form in (b) in FIG. 10, a first display region and a second display region that are arranged in a left-right form in (a) in FIG. 10. A region height height1 of the first display region shown in (b) in FIG. 10 is equal to a region width width1 of the first display region shown in (a) in FIG. 10.

Figure 11:
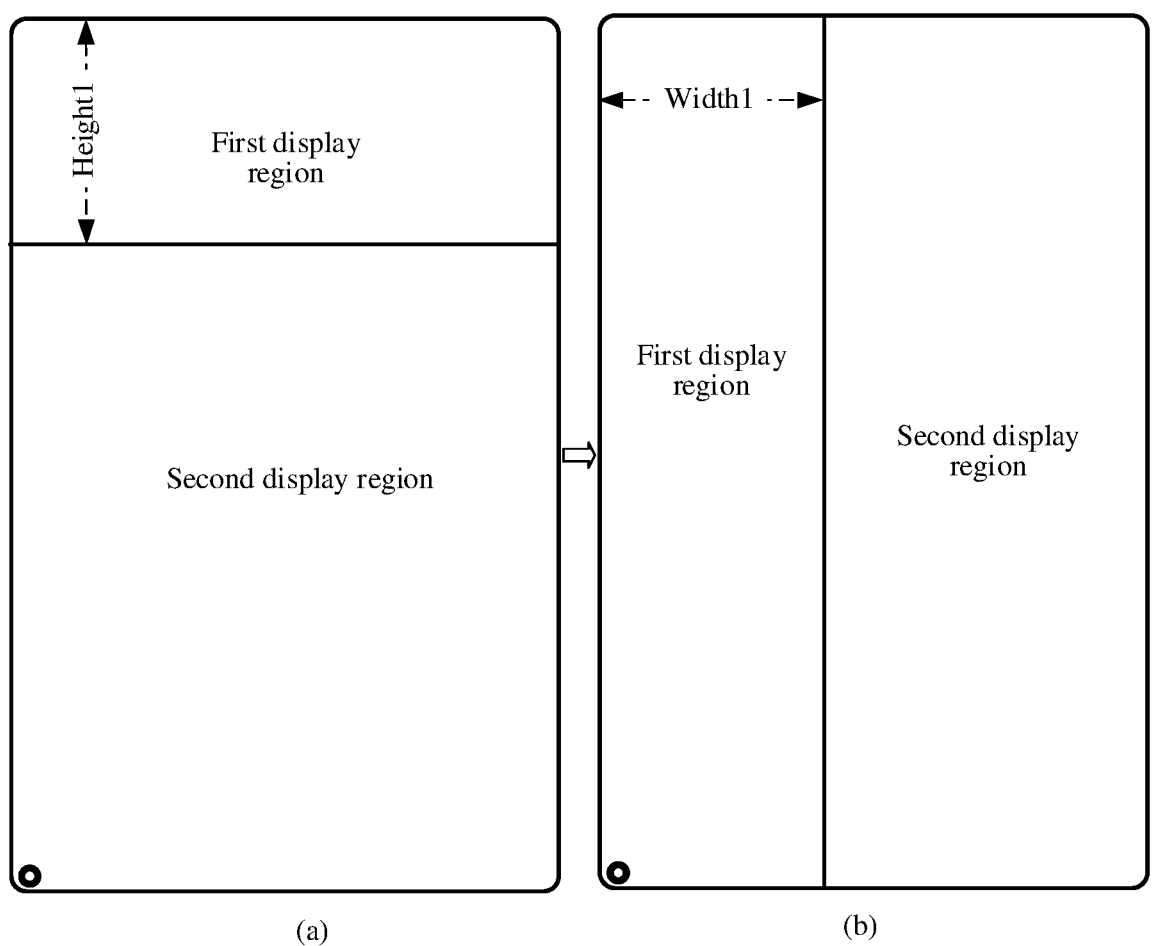
FIG. 11 is an example diagram 2 of reorganizing a first display region and a second display region.

When the first terminal device 301 changes from the landscape-mode display state to the portrait-mode display state, the first terminal device 301 may reorganize the first display region and the second display region with reference to the manner in (1). To be specific, a first display region and a second display region that are arranged in an up-down form are reorganized into a first display region and a second display region that are arranged in a left-right form. A region height of the first display region existing before reorganization is equal to a region width of the reorganized first display region. For example, the first terminal device 301 may reorganize, into a first display region and a second display region that are arranged in a left-right form in (b) in FIG. 11, a first display region and a second display region that are arranged in an up-down form in (a) in FIG. 11. A region width width1 of the first display region shown in (b) in FIG. 11 is equal to a region height height1 of the first display region shown in (a) in FIG. 11.

When the first terminal device 301 changes from the folded-screen display state to the unfolded-screen display state, the first terminal device 301 may reorganize the first display region and the second display region with reference to the manner in (a). To be specific, when the second terminal device 302 is in the landscape-mode display state, the first terminal device 301 may vertically divide the display interface of the second terminal device 302 based on a screen width of an unfolded home screen and the interface information of the second terminal device 302, to obtain a first display region and a second display region that are arranged in a left-right form. When the second terminal device 302 is in the portrait-mode display state, the first terminal device 301 may horizontally divide the display interface of the second terminal device 302 based on a screen height of the unfolded home screen and the interface information of the second terminal device 302, to obtain the first display region and the second display region that are arranged in an up-down form.

Figure 12:
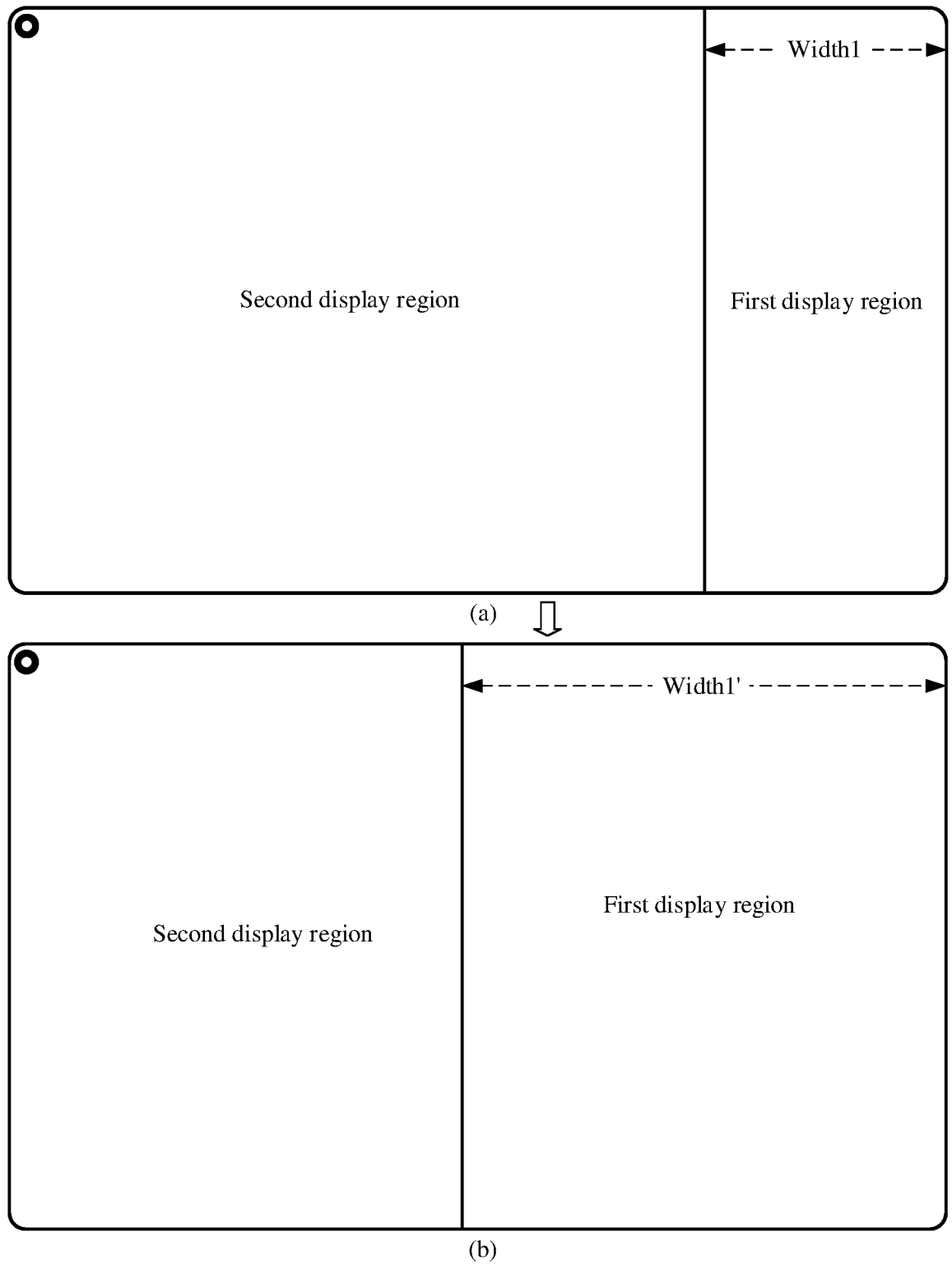
FIG. 12 is an example diagram 3 of reorganizing a first display region and a second display region.
Figure 13:
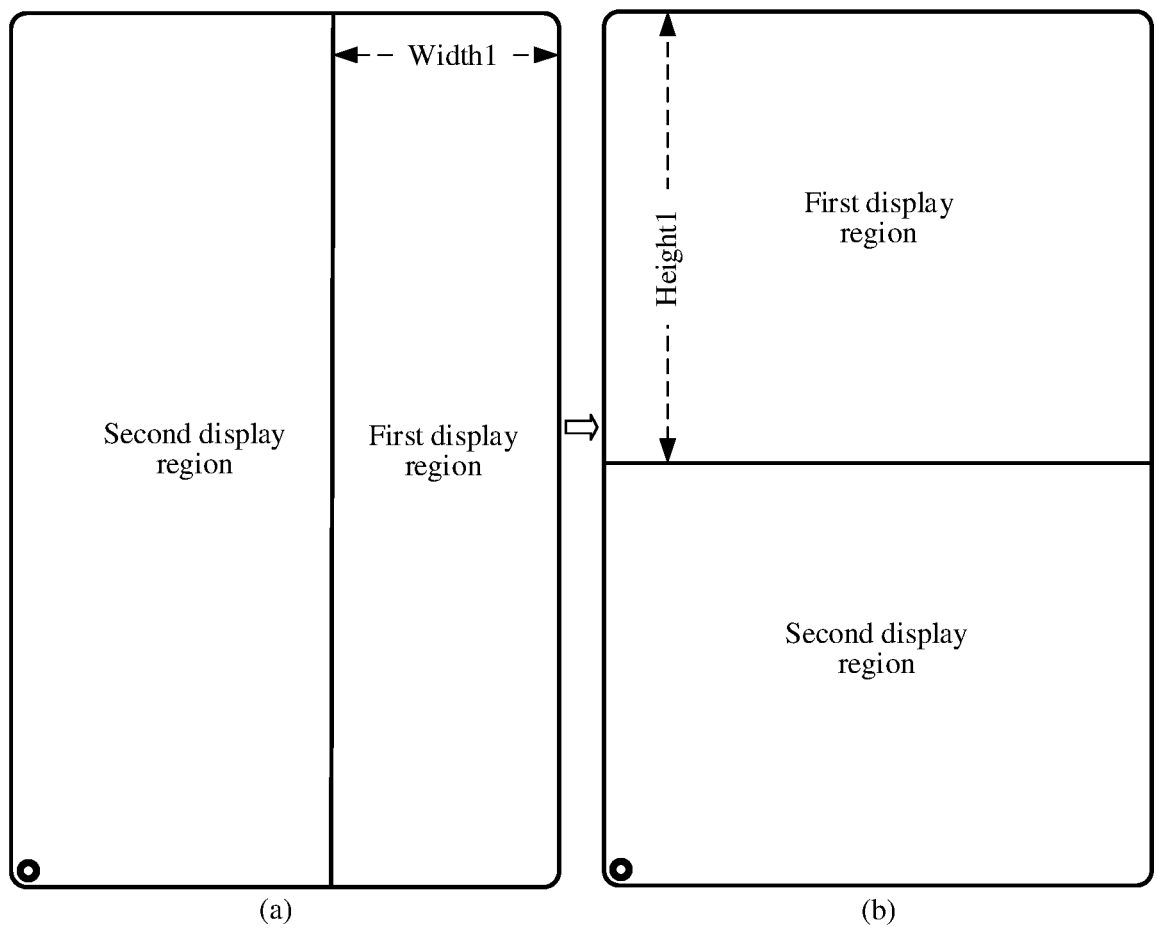
FIG. 13 is an example diagram 4 of reorganizing a first display region and a second display region.

For example, when the second terminal device 302 is in the landscape-mode display state, the first terminal device 301 may reorganize a first display region and a second display region in (a) in FIG. 12 into a first display region and a second display region in (b) in FIG. 12. A region width width1 of a first display region existing before reorganization is equal to a screen width of a home screen existing after the first terminal device 301 is folded, and a region width widths' of a reorganized first display region is equal to a screen width of a home screen existing after the first terminal device 301 is unfolded. For example, when the second terminal device 302 is in the portrait-mode display state, the first terminal device 301 may reorganize a first display region and a second display region in (a) in FIG. 13 into a first display region and a second display region in (b) in FIG. 13. A region width widths of a first display region existing before reorganization is equal to a screen width of a home screen existing after the first terminal device 301 is folded, and a region height heights of a reorganized first display region is equal to a screen height of a home screen existing after the first terminal device 301 is unfolded.

In a possible implementation, in a scenario in which the first terminal device 301 is in the unfolded-screen display state, when the first terminal device 301 changes from the landscape-mode display state to the portrait-mode display state, the first terminal device 301 may reorganize the first display region and the second display region with reference to the manner in (1). When the first terminal device 301 changes from the portrait-mode display state to the landscape-mode display state, the first terminal device 301 may reorganize the first display region and the second display region with reference to the manner in (2).

In another possible implementation, when the first terminal device 301 determines the first display region and the second display region based on a larger one in a screen width and a screen height of an unfolded home screen in a scenario in which the first terminal device 301 is in the unfolded-screen display state, for example, if the first terminal device 301 determines the region width of the first display region based on the screen height of the home screen, namely, the larger one when the unfolded first terminal device 301 is in the landscape-mode display state, when the first terminal device 301 changes from the landscape-mode display state to the portrait-mode display state, the first terminal device 301 may not need to reorganize the first display region and the second display region, and may directly display content in the first terminal device 301 in the portrait-mode display state in the first display region and the second display region that are determined in the landscape-mode display state, to reduce an operation delay of collaborative display and improve a display effect.

When the first terminal device 301 changes from the unfolded-screen display state to the folded-screen display state, the first terminal device 301 may reorganize the first display region and the second display region with reference to the manner in (3). To be specific, when the first terminal device 301 is in the landscape-mode display state, the first terminal device 301 may horizontally divide the display interface of the second terminal device 302 based on a screen height of a home screen of the folded first terminal device 301 and the interface information of the second terminal device 302, to obtain a first display region and a second display region that are arranged in an up-down form. When the first terminal device 301 is in the portrait-mode display state, the first terminal device 301 may vertically divide the display interface of the second terminal device 302 based on a screen width of the home screen of the folded first terminal device 301 and the interface information of the second terminal device 302, to obtain a first display region and a second display region that are arranged in a left-right form.

Figure 14:
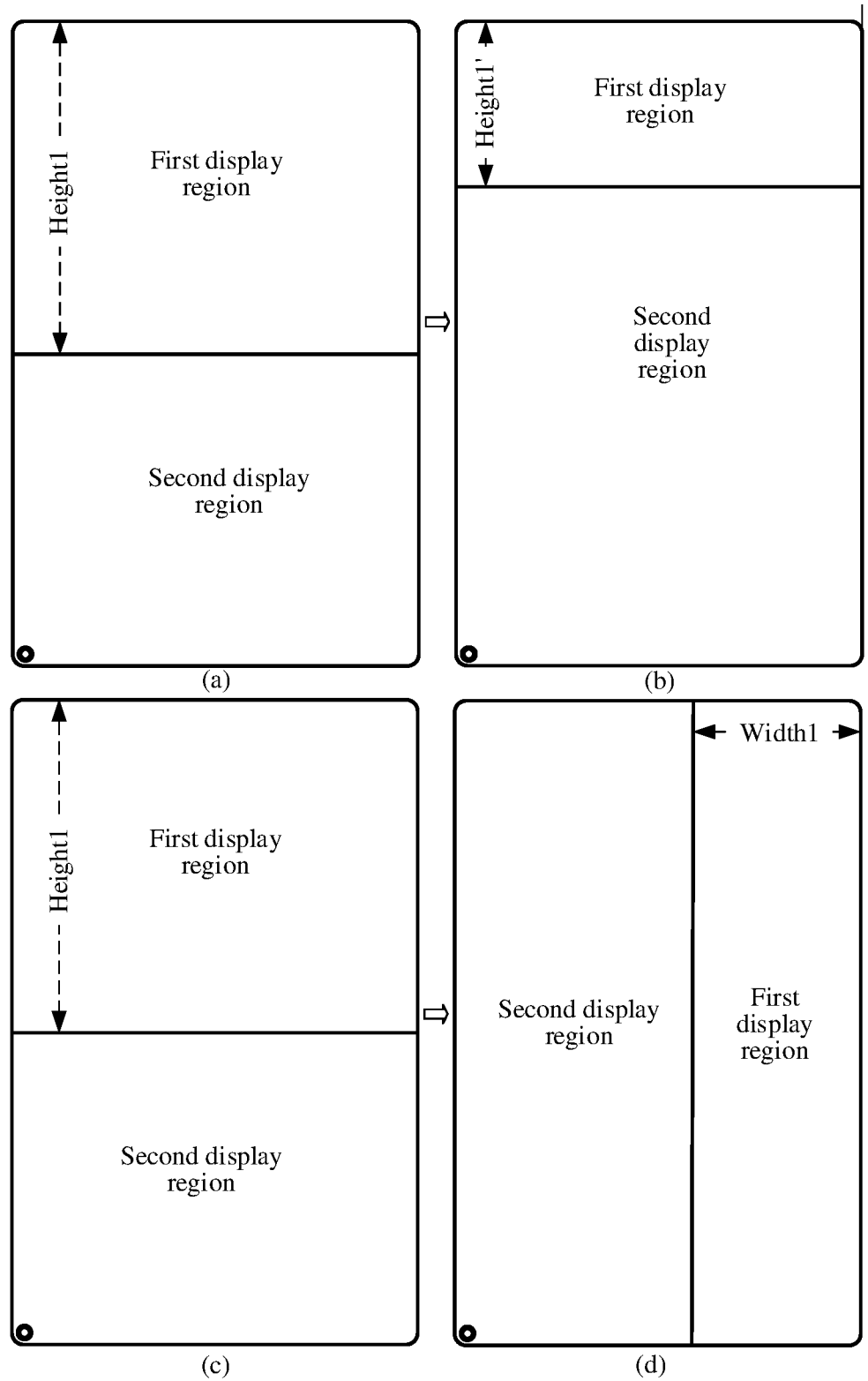
FIG. 14 is an example diagram 5 of reorganizing a first display region and a second display region.

For example, when the unfolded first terminal device 301 and the folded first terminal device 301 are in the landscape-mode display state, the first terminal device 301 may reorganize a first display region and a second display region in (a) in FIG. 14 into a first display region and a second display region in (b) in FIG. 14. A region height height1 of the first display region existing before reorganization is equal to a screen height of an unfolded home screen of the first terminal device 301, and a region height heights' of the reorganized first display region is equal to a screen height of a folded home screen of the first terminal device 301. For example, when the unfolded first terminal device 301 and the folded first terminal device 301 are in the portrait-mode display state, the first terminal device 301 may reorganize a first display region and a second display region in (c) in FIG. 14 into a first display region and a second display region in FIG. 14. A region height height1 of a first display region existing before reorganization is equal to a screen height of an unfolded home screen of the first terminal device 301, and a region width widths of a reorganized first display region is equal to a screen width of a folded home screen of the first terminal device 301.

Optionally, when the display state of the first terminal device 301 changes, but a content display manner of the home screen of the first terminal device 301 does not change correspondingly, if the first display region and the second display region are reorganized, a display effect of content of the home screen in the second terminal device 302 is affected, and it is inconvenient for the user to browse. Therefore, when the display state of the first terminal device 301 changes, if the content display manner of the home screen changes with the display state of the first terminal device 301, the first terminal device 301 may reorganize the first display region and the second display region. If the content display manner of the home screen does not change with the display state of the first terminal device 301, the first terminal device 301 may not reorganize the first display region and the second display region.

The content display manner of the home screen may be determined in an existing method. This is not specifically limited in this embodiment of this application. For example, an activity manager service (activity manager service, AMS) in the first terminal device 301 may be used to obtain a landscape/portrait-mode state of an activity corresponding to the home screen, to determine the content display manner of the home screen based on the landscape/portrait-mode state of the activity.

Optionally, when the display state of the first terminal device 301 does not change, but the content display manner of the home screen of the first terminal device 301 changes, for example, when the user taps a landscape/portrait-mode switching button of an application displayed on the home screen to change the content display manner of the home screen, but the first terminal device 301 is not rotated correspondingly, the first terminal device 301 may alternatively reorganize the first display region and the second display region based on a change in the content display manner, to improve the display effect of the content of the home screen in the second terminal device 302, help the user browse content in the second terminal device 302, and improve browsing experience of the user.

The content display manner may include landscape-mode display and portrait-mode display. In this embodiment of this application, for a case of reorganizing the first display region and the second display region based on the content display manner, refer to the manners in (1) and (2). Specifically, when the content display manner of the home screen changes from portrait-mode display to landscape-mode display, the first terminal device 301 may reorganize the first display region and the second display region with reference to the method in (2). To be specific, the first terminal device 301 may obtain the interface information of the display interface of the second terminal device 302, and may horizontally divide the display interface of the second terminal device 302 based on the current screen width (that is, the screen width in the portrait-mode display state) of the home screen of the first terminal device 301 and the interface information of the second terminal device 302, to obtain a first display region and a second display region that are arranged in an up-down form. When the content display manner of the home screen changes from landscape-mode display to portrait-mode display, the first terminal device 301 may reorganize the first display region and the second display region in the method in (1). To be specific, the first terminal device 301 may obtain the interface information of the display interface of the second terminal device 302, and may vertically divide the display interface of the second terminal device 302 based on the current screen height (that is, the screen height in the landscape-mode display state) of the home screen of the first terminal device 301 and the interface information of the second terminal device 302, to obtain a first display region and a second display region that are arranged in a left-right form.

In this embodiment of this application, after the first display region and the second display region are reorganized, the content display manner and the relative location of the home screen in the first display region may change with the display state of the first terminal device 301 or the content display manner of the home screen, but the virtual screen in the second display region is still displayed based on the content display manner and the relative location that exist before reorganization. For example, if the first virtual screen and the second virtual screen in the second display region are displayed in the second display region in a portrait mode in a left-to-right arrangement sequence before reorganization, after the first display region and the second display region are reorganized, the first virtual screen and the second virtual screen are still displayed in a reorganized second display region in the portrait mode in the left-to-right arrangement sequence, to reduce a quantity of times of refreshing and laying out content in the virtual screen again, reduce a display delay in the second display region, improve a display effect, and improve user experience.

It can be understood that when the region height of the reorganized second display region is less than the screen height of the virtual screen or the region width of the reorganized second display region is less than the screen width of the virtual screen, before displaying the virtual screen in the second display region, the second terminal device 302 may proportionally reduce the virtual screen based on the reorganized second display region, and then may completely display the proportionally reduced virtual screen in the second display region of the second terminal device 302 based on a relative location that is of the virtual screen in the second display region and that exists before reorganization; or the first terminal device 301 may proportionally reduce the virtual screen based on the reorganized second display region, and may send display information of the proportionally reduced virtual screen to the second terminal device 302, and the second terminal device 302 may completely display the virtual screen in the second display region based on a relative location that is of the virtual screen in the second display region and that exists before reorganization. In this way, it can be ensured that the virtual screen can be completely displayed in the second terminal device 302.

The following provides example descriptions of the collaborative display method provided in embodiments of this application with reference to specific application scenarios. In the following application scenarios, example descriptions are provided by using an example in which a first terminal device 301 determines and reorganizes a first display region and a second display region.

Figures 1, 15:
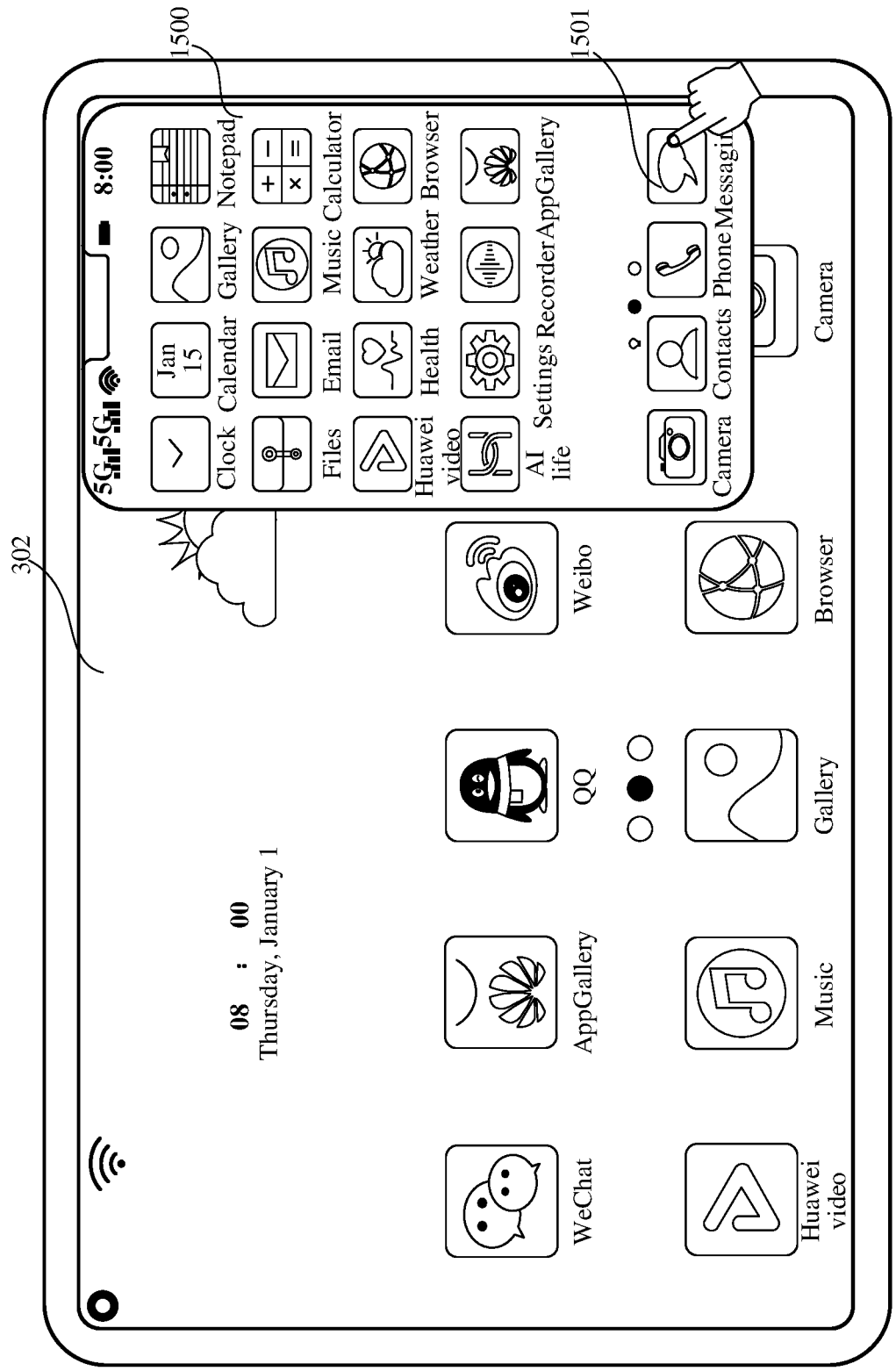
Figures 2, 15:
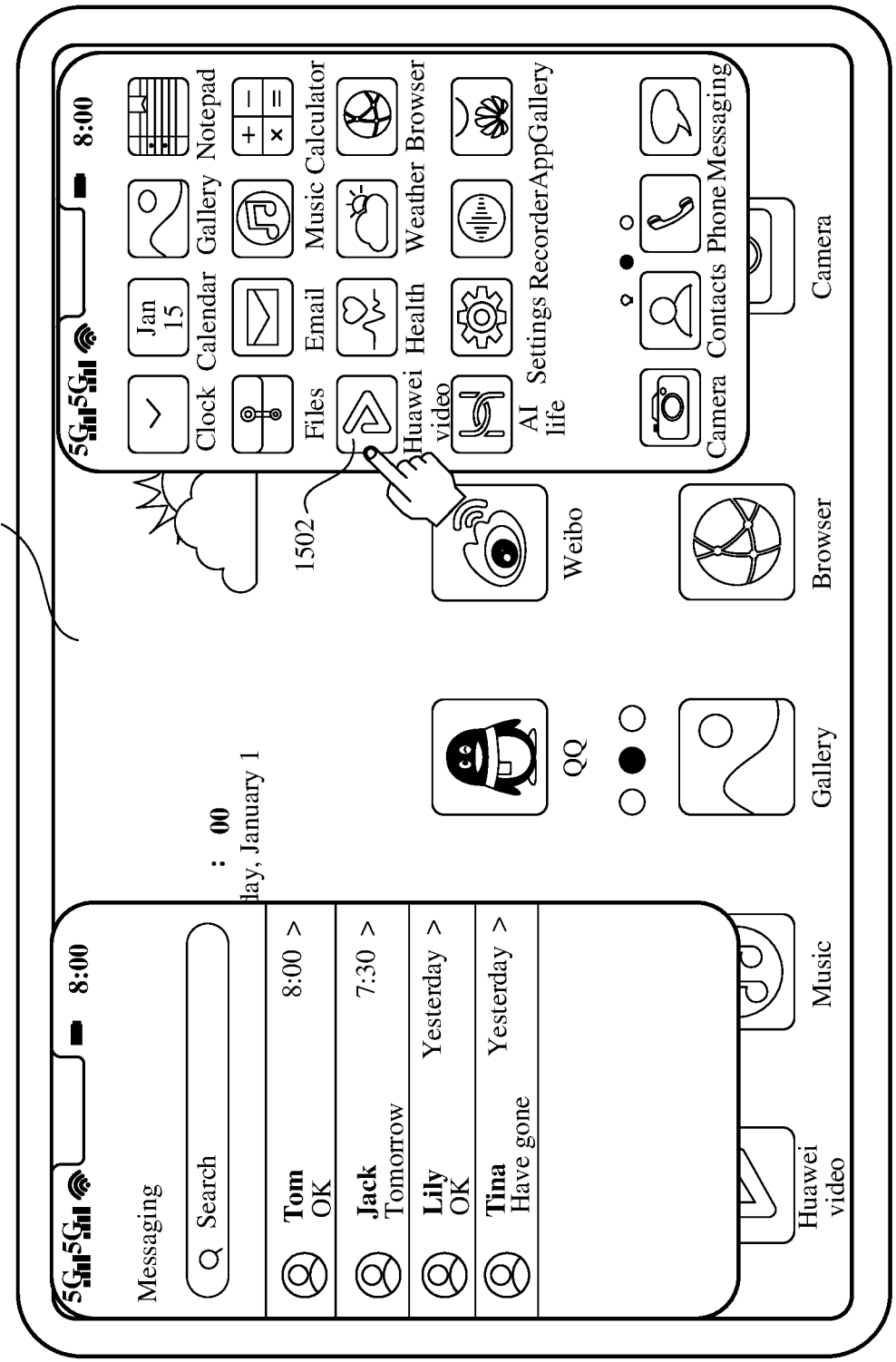

For example, in a scenario in which the first terminal device 301 is in a portrait-mode display state and a second terminal device 302 is in a landscape-mode display state, after the first terminal device 301 and the second terminal device 302 perform multi-screen collaboration, the first terminal device 301 may determine that the first display region and the second display region are horizontally arranged in a left-right form. For example, the first display region is on a right side, and the second display region is on a left side. The first terminal device 301 may send display information of a home screen of the first terminal device 301 and location information of the first display region to the second terminal device 302. As shown in (a) in FIG. 15-1 and FIG. 15-2, after receiving the display information of the home screen and the location information of the first display region, the second terminal device 302 may display a home screen 1500 in the first display region in a display interface of the second terminal device 302.

When a user taps or touches a Messaging application 1501 on the home screen 1500 in the second terminal device 302, the second terminal device 302 may send, to the first terminal device 301, an instruction indicating that the user taps or touches the Messaging application. After receiving the instruction, the first terminal device 301 may create a first virtual screen, obtain application data of the Messaging application, render the application data of the Messaging application to obtain window data, and combine the window data and then display the combined window data on the first virtual screen. Subsequently, the first terminal device 301 may send display information of the first virtual screen and location information of the second display region to the second terminal device 302. As shown in (b) in FIG. 15-1 and FIG. 15-2, after receiving the display information of the first virtual screen and the location information of the second display region, the second terminal device 302 may display the first virtual screen in the second display region in the display interface of the second terminal device 302 in a left-to-right arrangement sequence, in other words, may display content of the Messaging application at a leftmost location in the second display region.

Figures 1, 16:
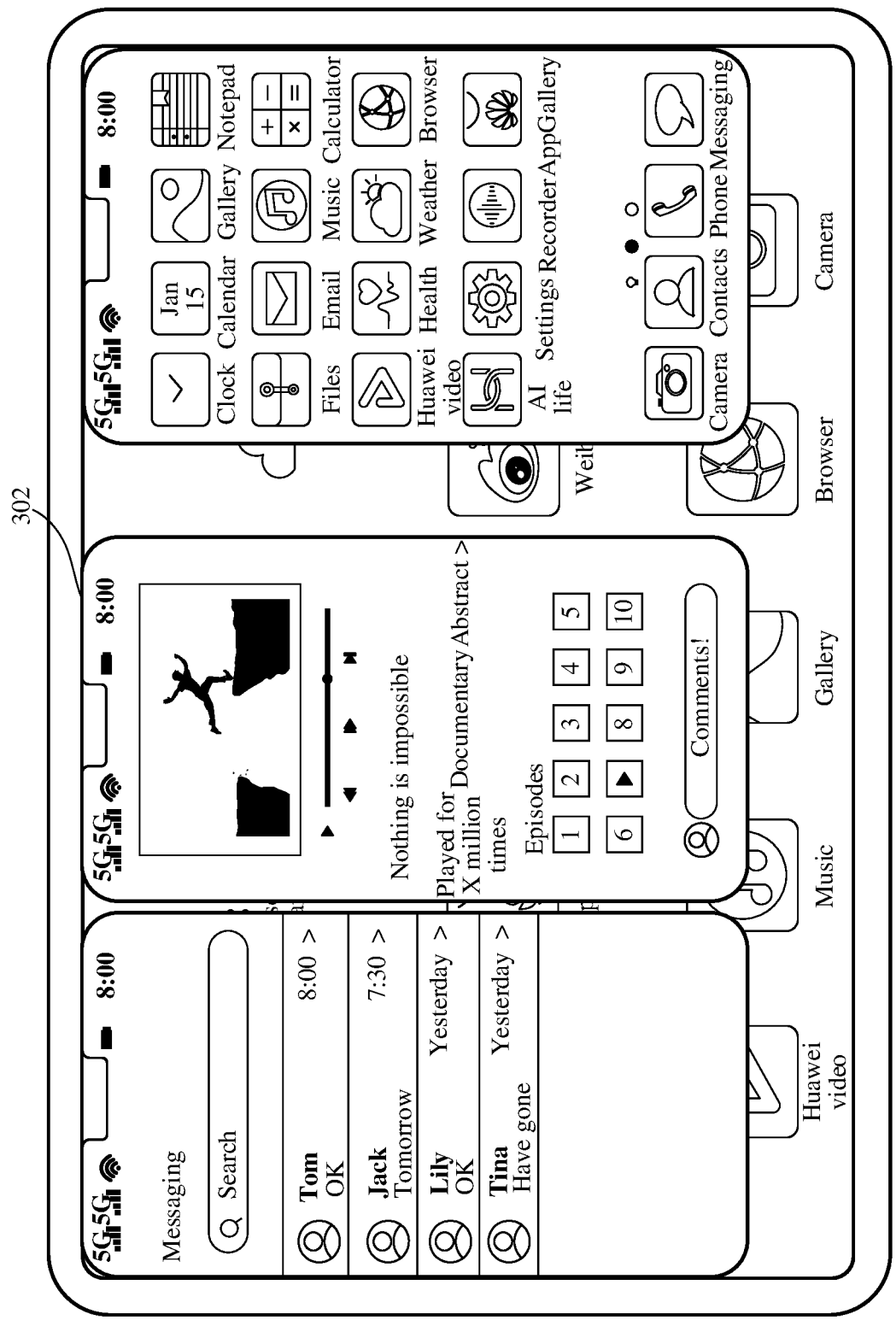
Figures 2, 16:
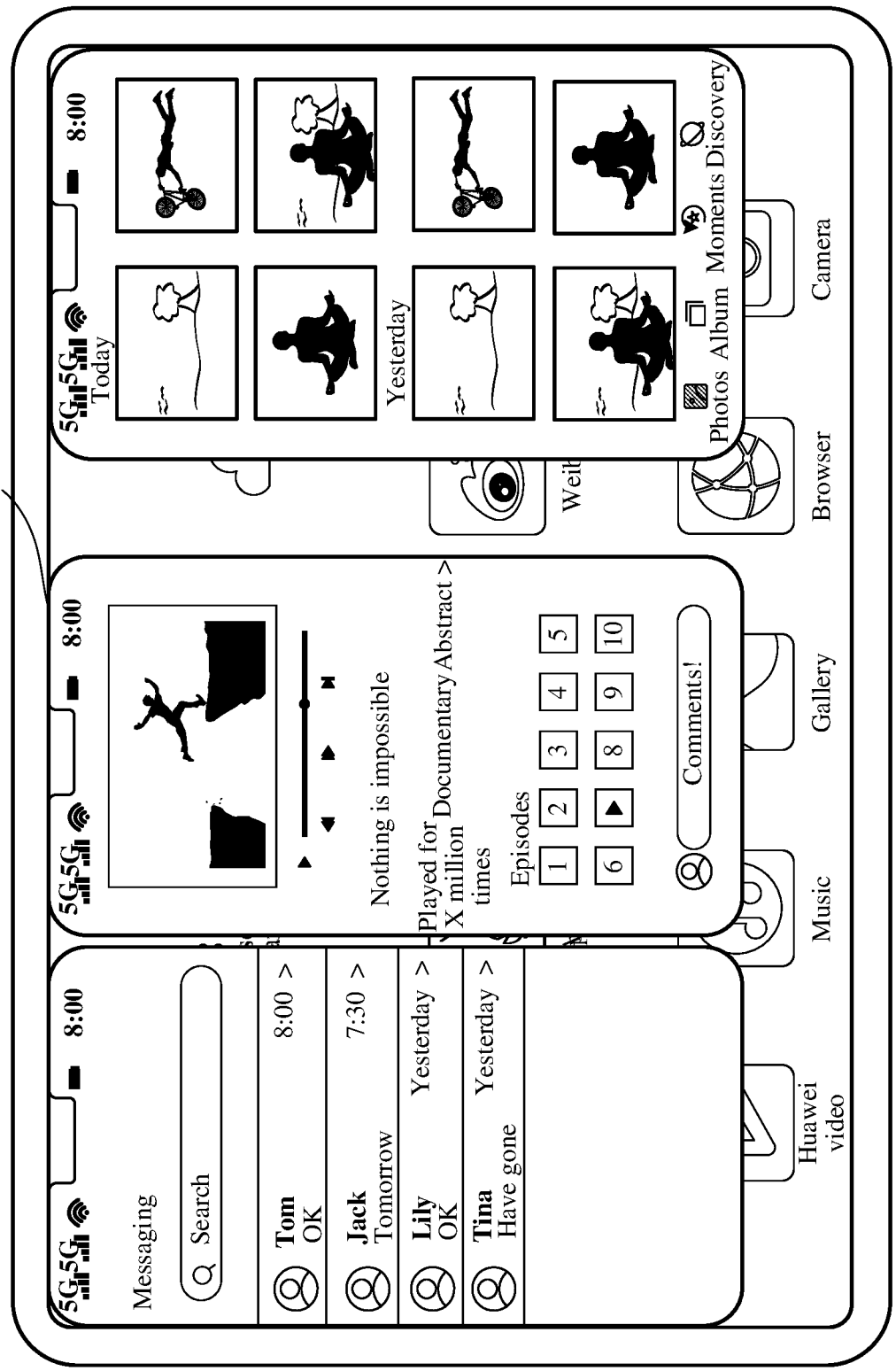

When the user continues to tap or touch a Huawei video application 1502 on the home screen 1500 in the second terminal device 302, the second terminal device 302 may send, to the first terminal device 301, an instruction indicating that the user taps or touches the Huawei video application. After receiving the instruction, the first terminal device 301 may create a second virtual screen, obtain application data of the Huawei video application, render application data of the Huawei video application to obtain window data, and combine the window data and then display the combined window data on the second virtual screen. Subsequently, the first terminal device 301 may send display information of the second virtual screen to the second terminal device 302. As shown in (a) in FIG. 16-1 and FIG. 16-2, after receiving the display information of the second virtual screen, the second terminal device 302 may display the second virtual screen on the right of the Messaging application in the second display region in a left-to-right display sequence.

When the user taps or touches a Gallery application in the first terminal device 301, the first terminal device 301 may open the Gallery application on the home screen, and may send display information of the home screen to the second terminal device 302. As shown in (b) in FIG. 16-1 and FIG. 16-2, after receiving the display information of the home screen, the second terminal device 302 may display content of the Gallery application in the first display region.

Figure 17:
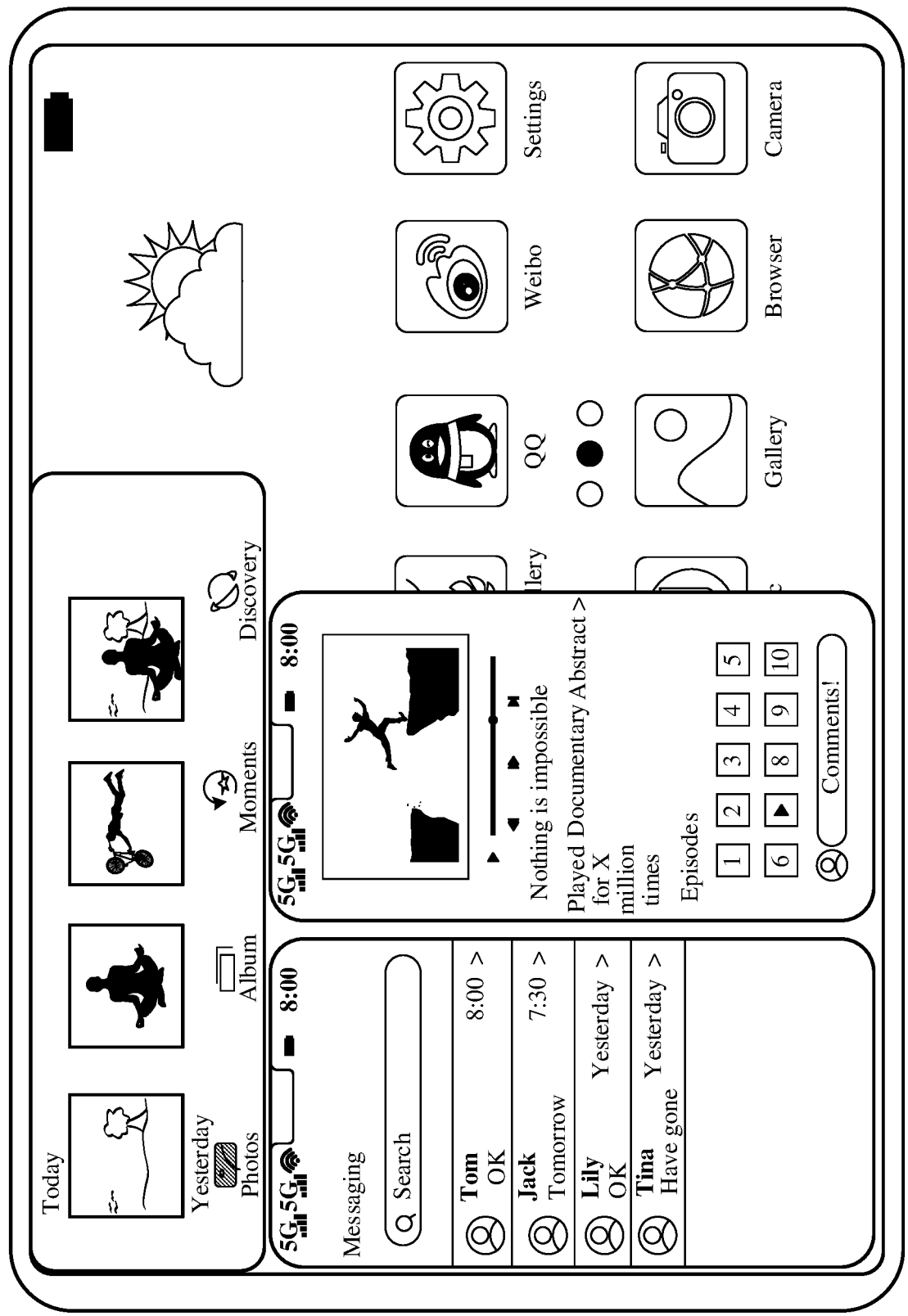

In a scenario in which the Messaging application, the Huawei video application, and the Gallery application are opened, when the user rotates the first terminal device 301 and a content display manner of the home screen of the first terminal device 301 changes accordingly, to be specific, when the user switches the first terminal device 301 from the portrait-mode display state to a landscape-mode display state and content displayed in the first terminal device 301 also changes from portrait-mode display to landscape-mode display, the first terminal device 301 may reorganize, into a first display region and a second display region that are vertically arranged in an up-down form, the first display region and the second display region that are horizontally arranged in the left-right form. For example, the reorganized first display region is on an upper side, and the reorganized second display region is on a lower side. Subsequently, the first terminal device 301 may send display information of a rotated home screen and location information of the reorganized first display region to the second terminal device 302, and send location information of the reorganized second display region and display information of the first virtual screen and the second virtual screen to the second terminal device 302. The first virtual screen and the second virtual screen do not change with the display state of the first terminal device 301, and relative locations of the first virtual screen and the second virtual screen in the second display region also remain unchanged. As shown in FIG. 17, after receiving the display information of the rotated home screen, the location information of the reorganized first display region, the location information of the reorganized second display region, and the display information of the first virtual screen and the second virtual screen, the second terminal device 302 may display the home screen in the reorganized first display region, and may display the first virtual screen and the second virtual screen in the reorganized second display region still in a portrait-mode display manner based on the relative locations of the first virtual screen and the second virtual screen in the second display region that exist before reorganization.

It can be understood that, when the user rotates the first terminal device 301, if content of a virtual screen (including at least one of the first virtual screen and the second virtual screen) does not change, the first terminal device 301 may not need to send display information of the virtual screen to the second terminal device 302, and the second terminal device 302 may directly display the virtual screen in the reorganized second display region based on previously obtained display information of the virtual screen and a relative location of the virtual screen in the second display region, to improve display efficiency of the virtual screen.

Figure 18:
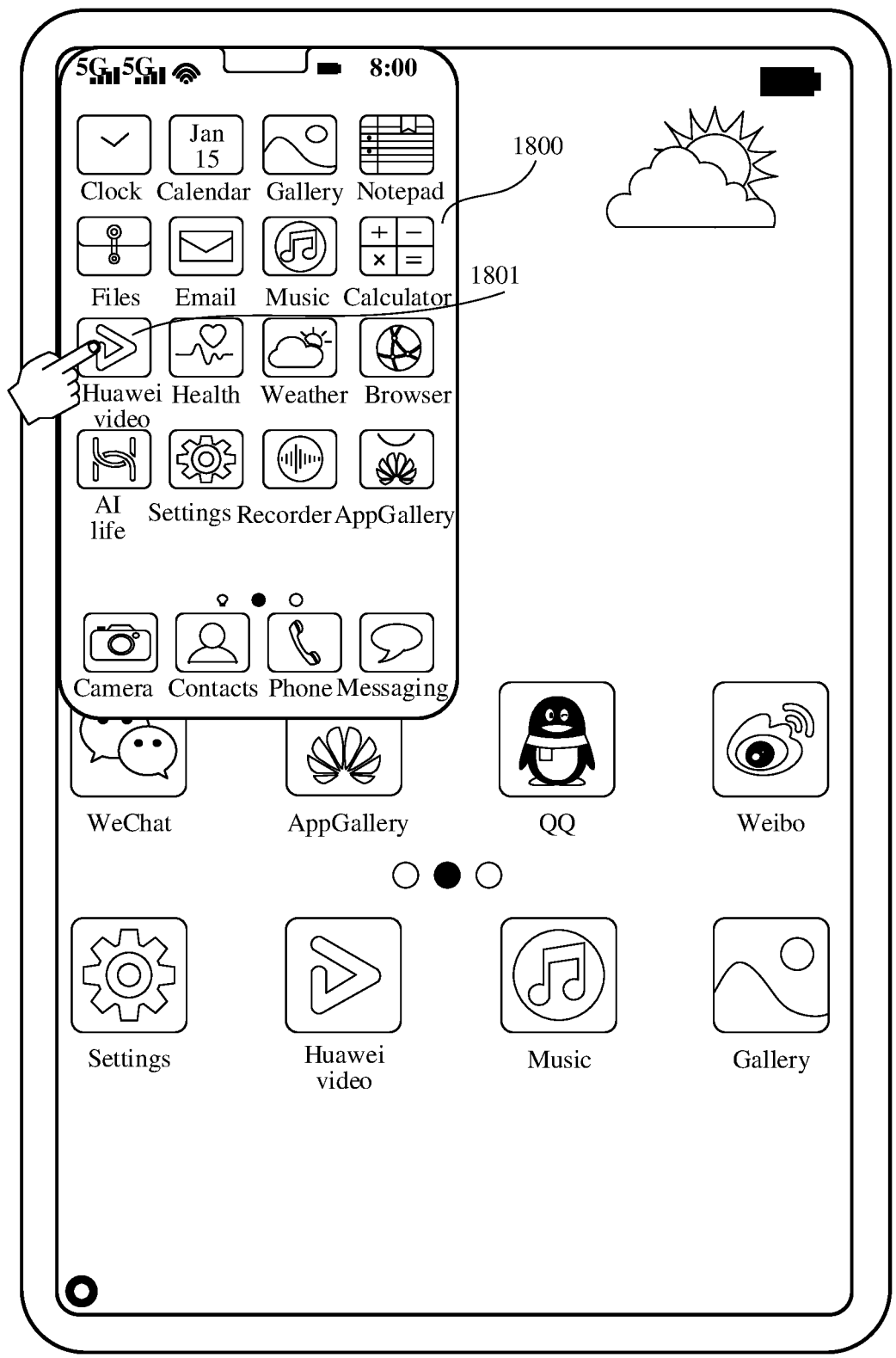
FIG. 18 to FIG. 21 are schematic diagrams 2 of application scenarios according to an embodiment of this application.

For example, in a scenario in which the first terminal device 301 is folded and is in a portrait-mode display state and the second terminal device 302 is in a portrait-mode display state, after the first terminal device 301 and the second terminal device 302 perform multi-screen collaboration, the first terminal device 301 may determine that the first display region and the second display region are horizontally arranged in a left-right form. For example, the first display region is on a right side, and the second display region is on a left side. The first terminal device 301 may send display information of a home screen 1800 of the first terminal device 301 and location information of the first display region to the second terminal device 302. As shown in FIG. 18, after receiving the display information of the home screen 1800 and the location information of the first display region, the second terminal device 302 may display the home screen 1800 in the first display region in a display interface of the second terminal device 302.

Figure 19:
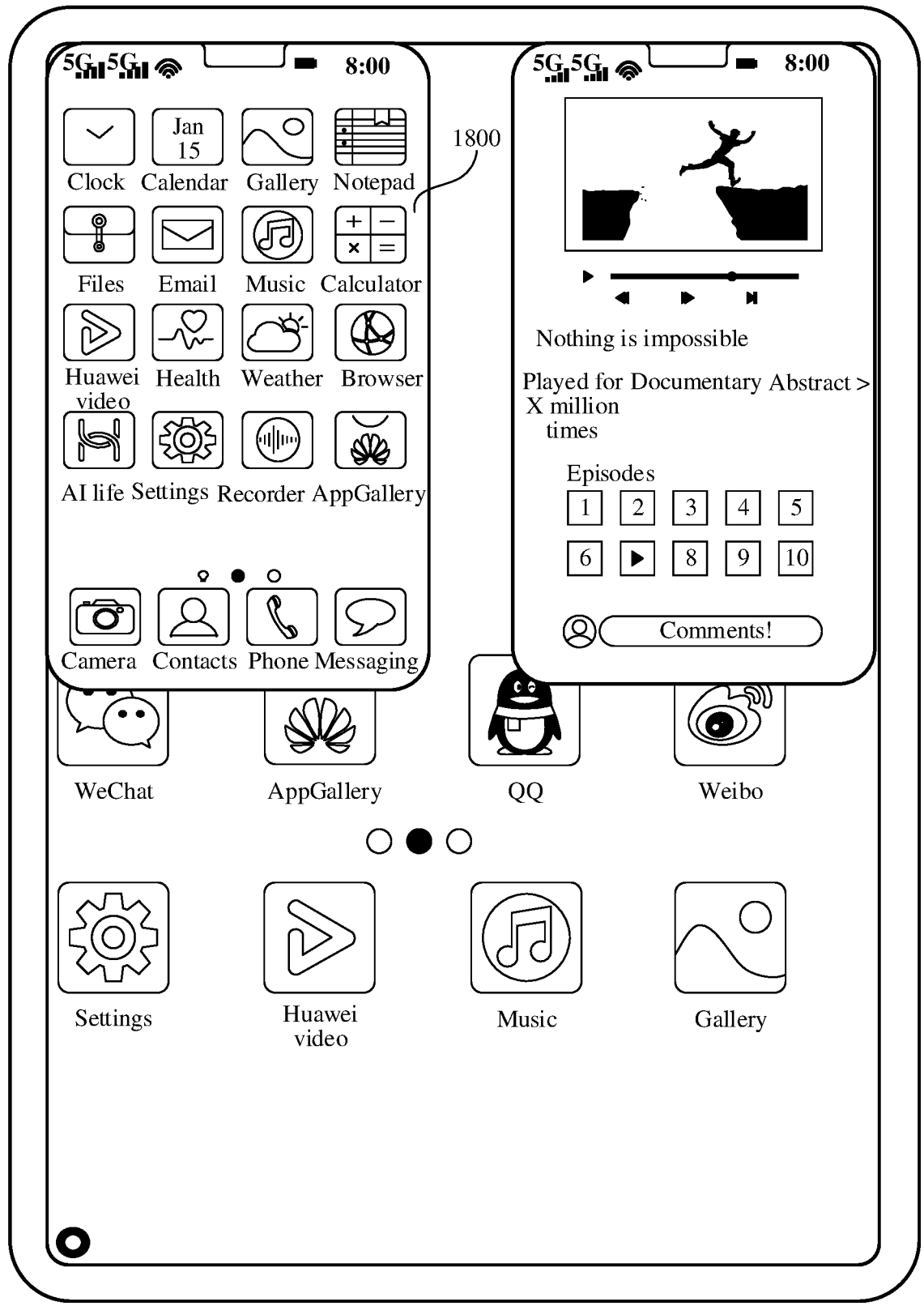

When a user taps a Huawei video application 1801 on the home screen 1800 in the second terminal device 302, the second terminal device 302 may send, to the first terminal device 301, an instruction indicating that the user taps the Huawei video application. After receiving the instruction, the first terminal device 301 may create a first virtual screen, obtain application data of the Huawei video application, render the application data of the Huawei video application to obtain window data, and combine the window data and then display the combined window data on the first virtual screen. Subsequently, the first terminal device 301 may send display information of the first virtual screen and location information of the second display region to the second terminal device 302. As shown in FIG. 19, after receiving the display information of the first virtual screen and the location information of the second display region, the second terminal device 302 may display the first virtual screen in the second display region in the display interface of the second terminal device 302 in a right-to-left display sequence, to be specific, display the Huawei Video application on a right side in the second display region.

Figure 20:
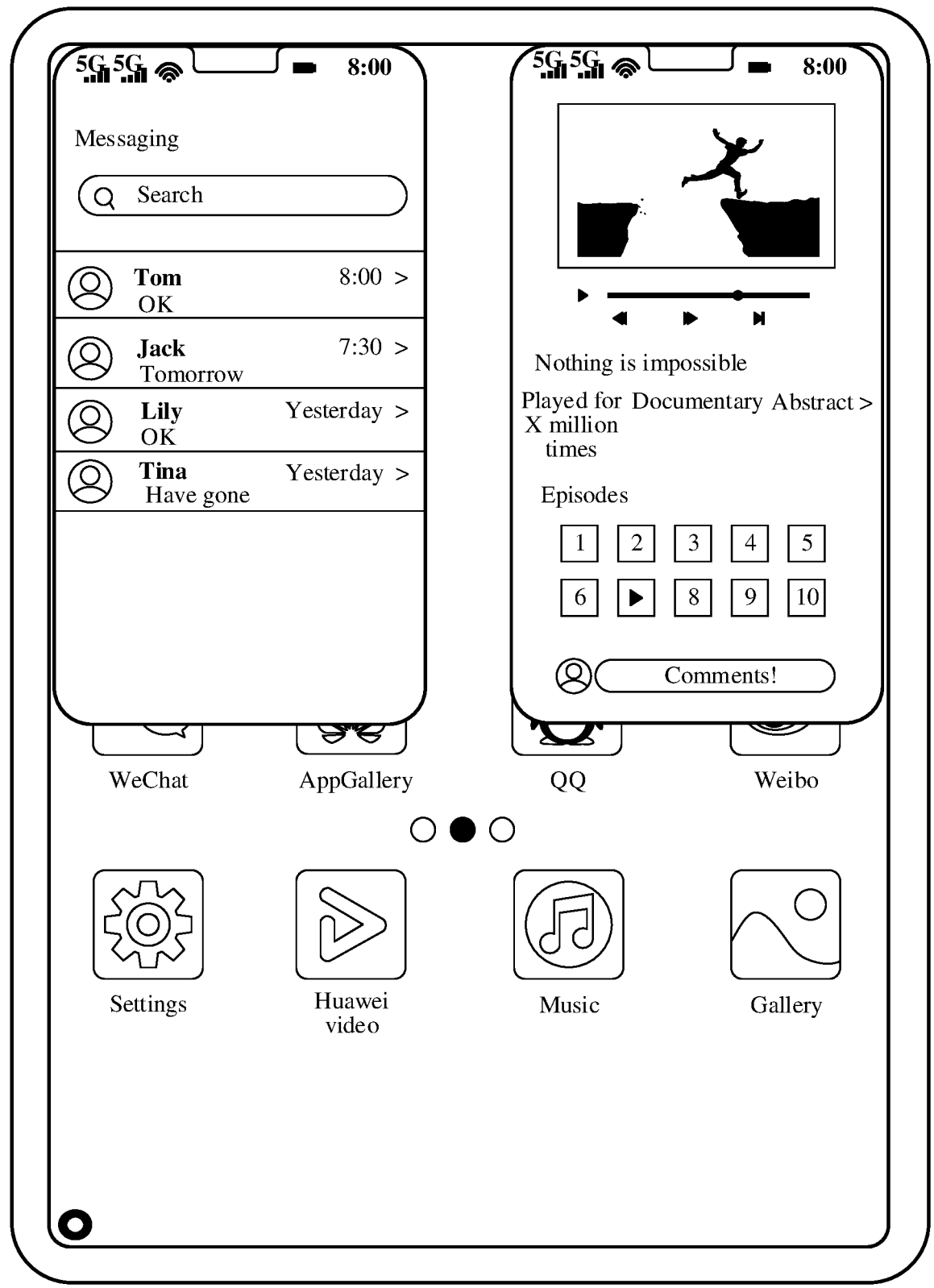

When the user taps or touches a Messaging application in the first terminal device 301, the first terminal device 301 may open the Messaging application on the home screen, and send display information of the home screen to the second terminal device 302. As shown in FIG. 20, after receiving the display information of the home screen, the second terminal device 302 may display content of the Messaging application in the first display region.

Figure 21:
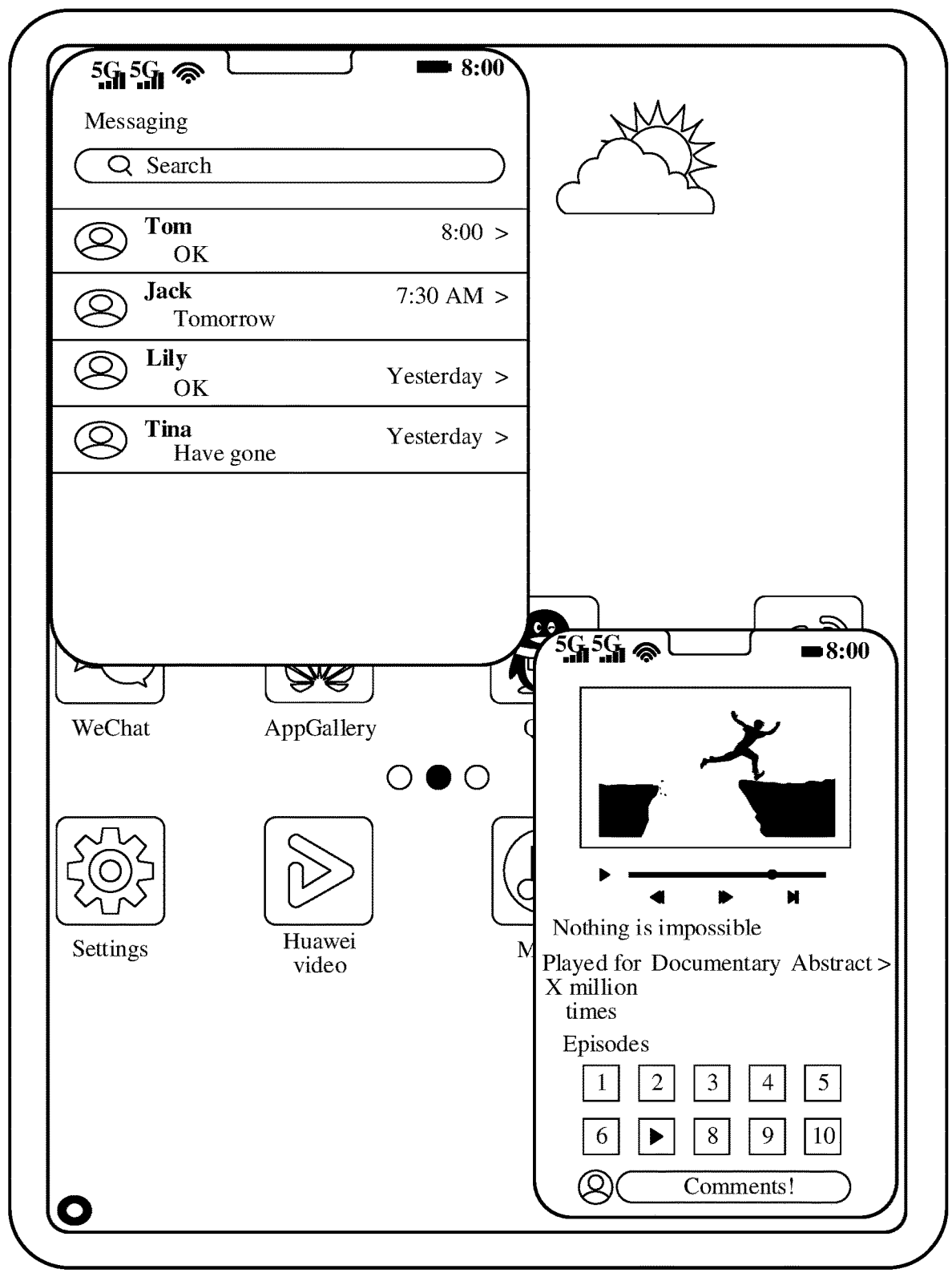

In a scenario in which the Messaging application and the Huawei video application are opened, when the user unfolds the first terminal device 301, the first terminal device 301 may reorganize, into a first display region and a second display region that are vertically arranged in an up-down form, the first display region and the second display region that are horizontally arranged in the left-right form. For example, the reorganized first display region is on an upper side, and the reorganized second display region is on a lower side. Subsequently, the first terminal device 301 may send display information of an unfolded home screen and location information of the reorganized first display region to the second terminal device 302, and send location information of the reorganized second display region and display information of the first virtual screen to the second terminal device 302. The first virtual screen does not change with a display state of the first terminal device 301, and a relative location of the first virtual screen in the second display region also remains unchanged. As shown in FIG. 21, after receiving the display information of the unfolded home screen, the location information of the reorganized first display region, the location information of the reorganized second display region, and the display information of the first virtual screen, the second terminal device 302 may display the home screen in the reorganized first display region, and may display the first virtual screen in the reorganized second display region still in a portrait-mode display manner based on the relative location of the first virtual screen in the second display region existing before reorganization, that is, display the first virtual screen on a right side in the reorganized second display region still in the portrait-mode display manner.

It can be understood that, when the user rotates the first terminal device 301, if content of the first virtual screen does not change, the first terminal device 301 may not need to send the display information of the first virtual screen to the second terminal device 302, and the second terminal device 302 may directly display the first virtual screen in the reorganized second display region based on the previously obtained display information of the first virtual screen and the relative location of the first virtual screen in the second display region, to improve display efficiency of the virtual screen.

Figure 22:
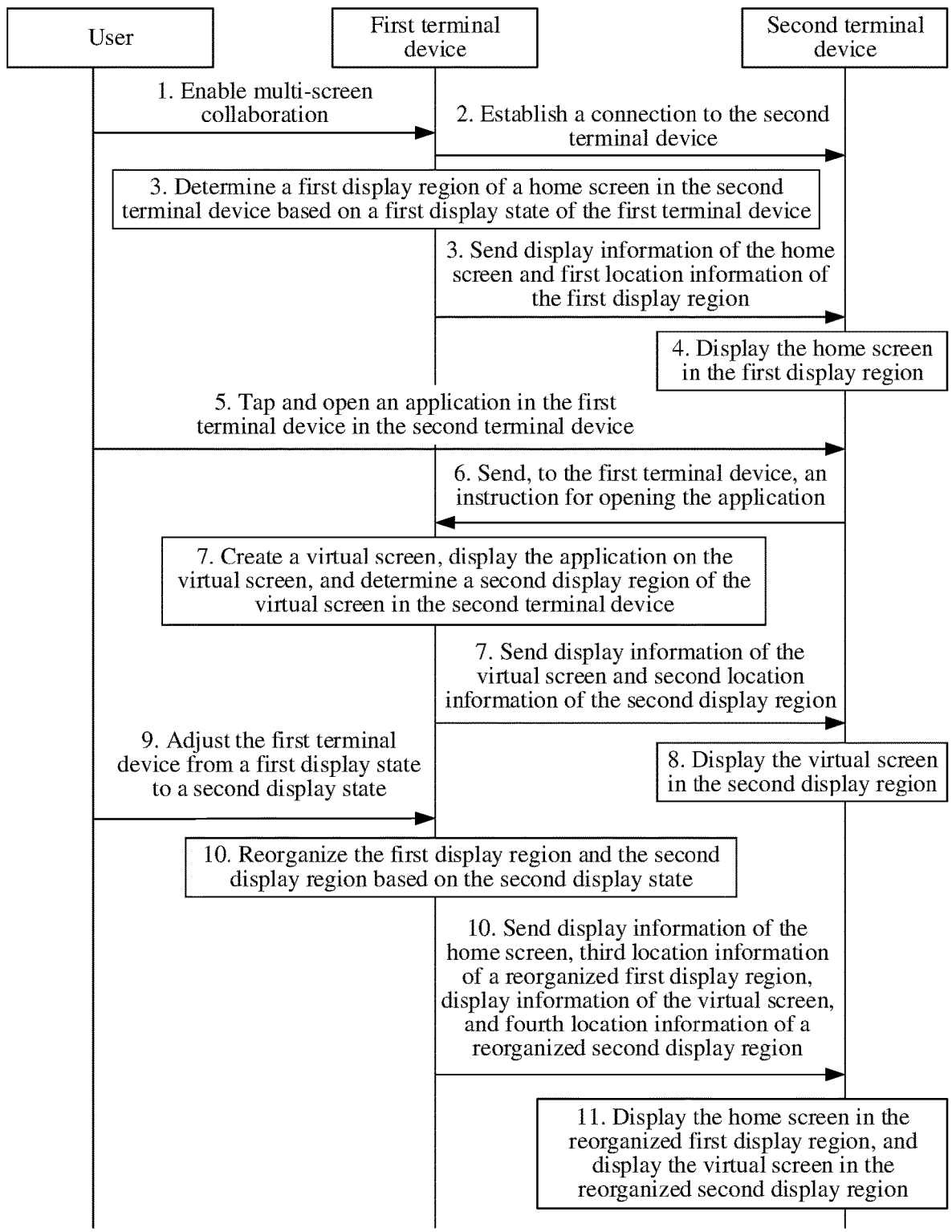
FIG. 22 is a schematic flowchart of a collaborative display method according to an embodiment of this application.

Based on the foregoing descriptions, the following briefly describes the collaborative display method provided in embodiments of this application. FIG. 22 is a schematic flowchart of a collaborative display method according to an embodiment of this application. As shown in FIG. 22, the method may include the following steps.

1. A user enables multi-screen collaboration in a first terminal device.

2. The first terminal device establishes a connection to a second terminal device.

It can be understood that the user may touch, by using a first preset region in which an NFC chip in the first terminal device is located, a second preset region in which an NFC chip in the second terminal device is located, to enable multi-screen collaboration. In this case, the first terminal device may pop up a pop-up connection box of "Are you sure you want to establish a connection to the second terminal device", and the pop-up connection box may include a "Connect" button and a "Cancel" button. When the user taps the "Connect" button in the first terminal device, the first terminal device may send a connection request to the second terminal device. After receiving the connection request, the second terminal device may pop up a pop-up confirmation box of "Are you sure you want to allow a connection to a first terminal device", and the pop-up confirmation box may include an "Allow" button and a "Reject" button. When the user taps the "Allow" button in the second terminal device, the second terminal device establishes a connection to the first terminal device. In this case, the second terminal device may collaboratively display content of the first terminal device.

3. The first terminal device determines a first display region of a home screen in the second terminal device based on a first display state of the first terminal device, and sends display information of the home screen and first location information of the first display region to the second terminal device.

4. The second terminal device displays the home screen in the first display region.

5. The user taps and opens an application in the first terminal device in the second terminal device.

6. The second terminal device sends, to the first terminal device, an instruction for opening the application.

7. After receiving the instruction, the first terminal device creates a virtual screen, displays the application on the virtual screen, determines a second display region of the virtual screen in the second terminal device, and sends display information of the virtual screen and second location information of the second display region to the second terminal device.

Specifically, the first terminal device may obtain the first display state of the first terminal device and interface information of a display interface of the second terminal device, and may determine the first display region of the home screen in the display interface of the second terminal device and the second display region of the virtual screen in the display interface of the second terminal device based on the first display state of the first terminal device and the interface information of the second terminal device.

A display state of the first terminal device 301 may be obtained in an existing method. This is not specifically limited in this embodiment of this application. For example, the display state of the first terminal device 301 may be obtained from an ATMS in the first terminal device 301 by using a window manager in the first terminal device 301. In addition, after determining the first display region corresponding to the home screen and the second display region corresponding to the virtual screen, the window manager may obtain and store the location information of the first display region and the location information of the second display region.

For example, when the first terminal device is an unfoldable terminal device and the first terminal device is in a portrait-mode display state, or when the first terminal device is a foldable terminal device and the first terminal device is folded and is in a portrait-mode display state, the first terminal device may determine that the first display region and the second display region are horizontally arranged in a left-right form, region heights of the first display region and the second display region are both the same as an interface height of the display interface of the second terminal device, and a sum of region widths of the first display region and the second display region is equal to an interface width of the display interface of the second terminal device.

For example, when the first terminal device is an unfoldable terminal device and the first terminal device is in a landscape-mode display state, or when the first terminal device is a foldable terminal device and the first terminal device is folded and is in a landscape-mode display state, the first terminal device may determine that the first display region and the second display region are vertically arranged in an up-down form, region widths of the first display region and the second display region are both the same as an interface width of the display interface of the second terminal device, and a sum of region heights of the first display region and the second display region is equal to an interface height of the display interface of the second terminal device.

For example, when the first terminal device is a foldable terminal device and the first terminal device is in an unfolded-screen display state, the first terminal device may determine the first display region and the second display region based on the interface information of the second terminal device. When determining, based on the interface information of the second terminal device, that the second terminal device is in the landscape-mode display state, the first terminal device may determine that the first display region and the second display region are horizontally arranged in a left-right form, region heights of the first display region and the second display region are both the same as an interface height of the display interface of the second terminal device, and a sum of region widths of the first display region and the second display region is equal to an interface width of the display interface of the second terminal device. When determining, based on the interface information of the second terminal device, that the second terminal device is in a portrait-mode display state, the first terminal device may determine that the first display region and the second display region are vertically arranged in an up-down form, region widths of the first display region and the second display region are both the same as an interface width of the display interface of the second terminal device, and a sum of region heights of the first display region and the second display region is equal to an interface height of the display interface of the second terminal device.

8. The second terminal device displays the virtual screen in the second display region.

9. The user adjusts the first terminal device from the first display state to a second display state.

10. The first terminal device reorganizes the first display region and the second display region based on the second display state, and sends display information of the home screen, third location information of a reorganized first display region, display information of the virtual screen, and fourth location information of a reorganized second display region to the second terminal device.

In this embodiment of this application, the user may rotate the first terminal device to adjust the first terminal device from the first display state to the second display state. The second display state is any one of a portrait-mode display state, a landscape-mode display state, a folded-screen display state, or an unfolded-screen display state. For example, the first terminal device may be adjusted from the portrait-mode display state to the landscape-mode display state, or may be adjusted from the landscape-mode display state to the portrait-mode display state; or may be adjusted from the folded-screen display state to the unfolded-screen display state; or may be adjusted from the unfolded-screen display state to the folded-screen display state, or the like.

When the display state of the first terminal device changes, a configuration file of an AMS in the first terminal device changes correspondingly. The AMS may send, to the window manager in the first terminal device, a message indicating that the display state of the first terminal device changes. After receiving the message, the window manager may obtain and store the location information of the first display region and the location information of the second display region again.

After the first display region and the second display region are reorganized, the first terminal device may send the display information of the home screen of the first terminal device, the third location information of the reorganized first display region, the display information of the virtual screen, and the fourth location information of the reorganized second display region to the second terminal device, so that the second terminal device displays the home screen and the virtual screen of the first terminal device.

11. The second terminal device displays the home screen in the reorganized first display region, and displays the virtual screen in the reorganized second display region.

A content display manner of the home screen may change with the display state of the first terminal device, but a content display manner of the virtual screen remains unchanged. That is, the content display manner of the virtual screen does not change with the display state of the first terminal device. For example, when both the home screen and the virtual screen are displayed a portrait mode, and the first terminal device changes from the portrait-mode display state to the landscape-mode display state, the home screen may change from portrait-mode display to landscape-mode display, but the virtual screen may still be displayed in the portrait mode.

In addition, a relative location of the virtual screen in the reorganized second display region is the same as a relative location of the virtual screen in the second display region existing before reorganization. In other words, when the display state of the first terminal device changes, content of an application displayed on the virtual screen may not need to be refreshed and laid out again. In other words, the second terminal device may still continue to display the virtual screen based on the relative location of the virtual screen in the second display region existing before reorganization and the original content display manner of the virtual screen.

In this embodiment of this application, the first display region of the home screen of the first terminal device in the second terminal device and the second display region of the virtual screen in the second terminal device may be determined based on the display state of the first terminal device, so that the second terminal device can display the home screen in the first display region and display the virtual screen in the second display region. However, when the display state of the first terminal device changes, only the content display manner of the home screen, the first display region, and the second display region may be dynamically adjusted, and the content display manner of the virtual screen and the relative location of the virtual screen in the second display region do not need to be adjusted. Therefore, content of the application displayed on the virtual screen does not need to be laid out or refreshed again, a delay in displaying content displayed in the second display region is reduced, user experience is improved. In this way, usability and practicability are high.

It should be understood that sequence numbers of the steps do not mean an execution sequence in embodiments. The execution sequence of the processes needs to be determined based on functions and internal logic of the processes, and should not constitute any limitation on the implementation processes of embodiments of this application.

An embodiment of this application further provides a terminal device. The terminal device includes at least one memory, at least one processor, and a computer program that is stored in the at least one memory and that may run on the at least one processor. When the processor executes the computer program, the terminal device is enabled to implement steps in any one of the foregoing method embodiments. For example, a structure of the terminal device may be shown in FIG. 1.

An embodiment of this application further provides a computer-readable storage medium. The computer-readable storage medium stores a computer program, and when the computer program is executed by a computer, the computer is enabled to implement steps in any one of the foregoing method embodiments.

An embodiment of this application provides a computer program product. When the computer program product runs on a terminal device, the terminal device is enabled to implement steps in any one of the foregoing method embodiments.

When an integrated unit is implemented in the form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the method embodiments can be implemented. The computer program includes computer program code. The computer program code may be in a source code form, an object code form, an executable file form, some intermediate forms, or the like. The computer-readable storage medium may include at least the following: any entity or apparatus that can carry the computer program code to an apparatus/terminal device, a recording medium, a computer memory, a read-only memory (read-only memory, ROM), a random access memory (random access memory, RAM), an electrical carrier signal, a telecommunication signal, and a software distribution medium, for example, a USB flash drive, a removable hard disk, a magnetic disk, or an optical disk. In some jurisdictions, the computer-readable medium cannot be an electrical carrier signal or a telecommunication signal according to legislation and patent practices.

In the foregoing embodiments, descriptions of all the embodiments have respective focuses. For a part that is not described in detail in an embodiment, refer to related descriptions in another embodiment.

Persons of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. Persons skilled in the art may use different methods to implement the described functions of each particular application, but it should not be considered that the implementation goes beyond the scope of this application.

In embodiments provided in this application, it should be understood that the disclosed apparatus/terminal device, and method may be implemented in another manner. For example, the described apparatus/terminal device embodiments are merely an example. For example, division into the modules or units is merely logical functional division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one place, or may be distributed on a plurality of network units. Some or all of the units may be selected based on actual requirements to achieve the objectives of the solutions of the embodiments.

The foregoing embodiments are merely used to describe the technical solutions of this application, but are not intended to limit the technical solutions. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application. The modifications or replacement shall fall within the protection scope of this application.

What is claimed is:

1. A display method, comprising:
    determining a first display region of a first home screen of a first terminal device in a second terminal device and a second display region of a virtual screen of the first terminal device in the second terminal device based on a first display state of the first terminal device;
    projecting the first home screen onto the second terminal device and sending first location information of the first display region to the second terminal device, wherein the second terminal device displays the first home screen in the first display region based on the first location information;
    projecting the virtual screen onto the second terminal device, and sending second location information of the second display region to the second terminal device, wherein the second terminal device displays the virtual screen in the second display region based on the second location information;
    when it is detected that the first terminal device is adjusted from the first display state to a second display state, adjusting a content display manner of the first home screen based on the second display state, to obtain a second home screen, and reorganizing the first display region and the second display region based on the second display state to obtain a reorganized first display region and a reorganized second display region; and
    projecting the second home screen and the virtual screen onto the second terminal device, and sending third location information of the reorganized first display region and fourth location information of the reorganized second display region to the second terminal device, wherein the second terminal device displays the second home screen in the reorganized first display region based on the third location information, and the second terminal device displays the virtual screen in the reorganized second display region based on the fourth location information.

2. The display method according to claim 1, wherein before projecting the virtual screen onto the second terminal device, the display method further comprises:
    when a start instruction that is for an application and that is sent by the second terminal device is obtained, creating the virtual screen based on the first home screen, and displaying an application interface of the application on the virtual screen, wherein the virtual screen is not displayed in the first terminal device.

3. The display method according to claim 1, wherein determining the first display region of the first home screen of the first terminal device in the second terminal device and the second display region of the virtual screen of the first terminal device in the second terminal device based on the first display state of the first terminal device comprises:
    obtaining interface information of the second terminal device; and
    determining the first display region and the second display region based on the first display state of the first terminal device and the interface information of the second terminal device.

4. The display method according to claim 3, wherein the interface information comprises an interface height and an interface width, and determining the first display region and the second display region based on the first display state of the first terminal device and the interface information of the second terminal device comprises:
    when the first display state is a portrait-mode display state, determining that a first region height of the first display region is the same as a second region height of the second display region, and the first region height and the second region height are the same as the interface height.

5. The display method according to claim 4, wherein the method further comprises:
    determining that a first region width of the first display region is the same as a screen width of the first home screen.

6. The display method according to claim 3, wherein the interface information comprises an interface height and an interface width, and the determining the first display region and the second display region based on the first display state of the first terminal device and the interface information of the second terminal device comprises:
    when the first display state is a landscape-mode display state, determining that a first region width of the first display region is the same as a second region width of the second display region, and the first region width and the second region width are the same as the interface width.

7. The display method according to claim 6, wherein the method further comprises: determining that a first region height of the first display region is the same as a screen height of the first home screen.

8. The display method according to claim 3, wherein the first terminal device is a terminal device with a foldable display, and the interface information comprises an interface height and an interface width; and determining the first display region and the second display region based on the first display state of the first terminal device and the interface information of the second terminal device comprises:
  when the first display state is an unfolded-screen display state, determining a third display state of the second terminal device based on the interface height and the interface width; and
  determining the first display region and the second display region based on the third display state and the interface information.

9. The display method according to claim 8, wherein determining the first display region and the second display region based on the third display state and the interface information comprises:
  when the third display state is a landscape-mode display state, determining that a first region height of the first display region is the same as a second region height of the second display region, and the first region height and the second region height are the same as the interface height.

10. The display method according to claim 9, wherein the method further comprises:
  determining that a first region width of the first display region is the same as a screen width of the first home screen or a screen height of the first home screen.

11. The display method according to claim 8, wherein determining the first display region and the second display region based on the third display state and the interface information comprises:
  when the third display state is a portrait-mode display state, determining that a first region width of the first display region is the same as a second region width of the second display region, and the first region width and the second region width are the same as the interface width.

12. The display method according to claim 11, wherein the method further comprises:
  determining that a first region height of the first display region is the same as a screen height of the first home screen or a screen width of the first home screen.

13. A display method, comprising:
  obtaining a first display state of a first terminal device, and determining a first display region of a first home screen of the first terminal device in a second terminal device and a second display region of a virtual screen of the first terminal device in the second terminal device based on the first display state;
  obtaining the first home screen projected by the first terminal device, and displaying the first home screen in the first display region;
  obtaining the virtual screen projected by the first terminal device, and displaying the virtual screen in the second display region;
  when it is determined that the first terminal device is adjusted from the first display state to a second display state, reorganizing the first display region and the second display region based on the second display state to obtain a reorganized first display region and a reorganized second display region; and
  obtaining a second home screen and the virtual screen that are projected by the first terminal device, displaying the second home screen in the reorganized first display region, and displaying the virtual screen in then reorganized second display region, wherein a content display manner of the second home screen corresponds to the second display state.

14. The display method according to claim 13, wherein before the obtaining the virtual screen projected by the first terminal device, the method comprises:
  sending, to the first terminal device in response to a start operation performed on an application on the first home screen, a start instruction for starting the application, wherein the first terminal device to start the application in response to the start instruction, and display an application interface of the application on the virtual screen.

15. A first terminal device, comprising:
  a non-transitory computer readable medium which contains computer-executable instructions; and
  one or more processors in communication with the non-transitory computer readable medium, wherein the one or more processors execute the instructions to:
  determine a first display region of a first home screen of the first terminal device in a second terminal device and a second display region of a virtual screen of the first terminal device in the second terminal device based on a first display state of the first terminal device;
  project the first home screen onto the second terminal device, and send first location information of the first display region to the second terminal device, wherein the second terminal device displays the first home screen in the first display region based on the first location information;
  projecting the virtual screen onto the second terminal device, and sending second location information of the second display region to the second terminal device, wherein the second terminal device displays the virtual screen in the second display region based on the second location information;
  when it is detected that the first terminal device is adjusted from the first display state to a second display state, adjusting a content display manner of the first home screen based on the second display state, to obtain a second home screen, and reorganizing the first display region and the second display region based on the second display state to obtain a reorganized first display region and a reorganized second display region; and
  projecting the second home screen and the virtual screen onto the second terminal device, and sending third location information of the reorganized first display region and fourth location information of the reorganized second display region to the second terminal device, wherein the second terminal device displays the second home screen in the reorganized first display region based on the third location information, and the second terminal device displays the virtual screen in the reorganized second display region based on the fourth location information.

16. The first terminal device according to claim 15, wherein the one or more processors execute the instructions to:
  before the projecting the virtual screen onto the second terminal device, when a start instruction that is for an application and that is sent by the second terminal device is obtained, creating the virtual screen based on the first home screen, and displaying an application interface of the application on the virtual screen, wherein the virtual screen is not displayed in the first terminal device.

17. The first terminal device according to claim 15, wherein the instructions to determine a first display region of a first home screen of the first terminal device in a second terminal device and a second display region of a virtual screen of the first terminal device in the second terminal device based on a first display state of the first terminal device comprises instructions to:
- obtain interface information of the second terminal device; and
- determine the first display region and the second display region based on the first display state of the first terminal device and the interface information of the second terminal device.

18. The first terminal device according to claim 17, wherein the interface information comprises an interface height and an interface width, and the instructions to determine the first display region and the second display region based on the first display state of the first terminal device and the interface information of the second terminal device comprises instructions to:
- when the first display state is a portrait-mode display state, determine that a first region height of the first display region is the same as a second region height of the second display region, and the first region height and the second region height are the same as the interface height.

19. The first terminal device according to claim 18, wherein the one or more processors further execute the instructions to:
- determine that a first region width of the first display region is the same as a screen width of the first home screen.

20. A second terminal device, comprising:
- a non-transitory computer readable medium which contains computer-executable instructions; and
- one or more processors in communication with the non-transitory computer readable medium, wherein the one or more processors execute the instructions to:
- obtain a first display state of a first terminal device, and determine a first display region of a first home screen of the first terminal device in the second terminal device and a second display region of a virtual screen of the first terminal device in the second terminal device based on the first display state;
- obtain the first home screen projected by the first terminal device, and display the first home screen in the first display region;
- obtain the virtual screen projected by the first terminal device, and display the virtual screen in the second display region;
- when it is determined that the first terminal device is adjusted from the first display state to a second display state, reorganize the first display region and the second display region based on the second display state to obtain a reorganized first display region and a reorganized second display region; and
- obtain a second home screen and the virtual screen that are projected by the first terminal device, displaying the second home screen in the reorganized first display region, and displaying the virtual screen in the reorganized second display region, wherein a content display manner of the second home screen corresponds to the second display state.

\* \* \* \* \*